(12) United States Patent
Guarracina et al.

(10) Patent No.: US 10,955,430 B2
(45) Date of Patent: Mar. 23, 2021

(54) AUTO-NAVIGATING ROBOTIC PROCESSING VEHICLE

(71) Applicant: HIGHRES BIOSOLUTIONS, INC., Beverly, MA (US)

(72) Inventors: Louis Guarracina, Newburyport, MA (US); Ulysses Gilchrist, Reading, MA (US)

(73) Assignee: HIGHRES BIOSOLUTIONS, INC., Beverly, MA (US)

(*) Notice: Subject to any disclaimer, the term of this patent is extended or adjusted under 35 U.S.C. 154(b) by 117 days.

(21) Appl. No.: 16/265,258

(22) Filed: Feb. 1, 2019

(65) Prior Publication Data
US 2019/0242916 A1 Aug. 8, 2019

Related U.S. Application Data

(60) Provisional application No. 62/625,796, filed on Feb. 2, 2018.

(51) Int. Cl.
*G06F 7/00* (2006.01)
*G06F 19/00* (2018.01)
(Continued)

(52) U.S. Cl.
CPC .......... *G01N 35/0099* (2013.01); *B25J 5/007* (2013.01); *B25J 9/1676* (2013.01);
(Continued)

(58) Field of Classification Search
CPC ....... G01N 35/0099; G01N 2035/0489; G01N 2035/0491; B25J 19/06; B25J 9/1676;
(Continued)

(56) References Cited

U.S. PATENT DOCUMENTS 6,477,442 B1* 11/2002 Valerino, Sr. .......... B65G 51/34
414/730
9,561,590 B1 2/2017 Nusser et al.
(Continued)

FOREIGN PATENT DOCUMENTS

EP 3292961 3/2018
WO 0103841 1/2001
(Continued)

OTHER PUBLICATIONS

International Search Report, International Application No. PCT/US2019/016558, dated May 14, 2019.
(Continued)

*Primary Examiner* — Yolanda R Cumbess
(74) *Attorney, Agent, or Firm* — Perman & Green, LLP

(57) ABSTRACT

An auto-navigating robotic processing vehicle including a carriage having a frame, an autonomous drive section configured to traverse the carriage effecting vehicle travel on a facility floor, and having an autonomous navigation section to effect autonomous navigation vehicle travel, a processing section with different processing modules connected to and carried by the frame, each of the different processing modules having a different predetermined laboratory processing function with a different predetermined function characteristic corresponding to the processing module and being automatically selectable to effect a preprocess or preprocess condition of laboratory samples and/or sample holders with respect to a process at a processing station, and a controller automatically selects at least one processing module and the corresponding predetermined function of the selected processing module effecting automatically the preprocess or preprocess condition based on an identification of a travel location for the vehicle and the process of the at the processing station.

47 Claims, 17 Drawing Sheets

(51) Int. Cl.
- *G01N 35/00* (2006.01)
- *B25J 19/06* (2006.01)
- *B25J 9/16* (2006.01)
- *B25J 5/00* (2006.01)
- *B25J 15/04* (2006.01)
- *G05D 1/02* (2020.01)
- *G01N 35/04* (2006.01)

(52) U.S. Cl.
CPC ............ *B25J 9/1679* (2013.01); *B25J 15/04* (2013.01); *B25J 19/06* (2013.01); *G05D 1/0212* (2013.01); *G01N 2035/0489* (2013.01); *G01N 2035/0491* (2013.01); *G05D 2201/0216* (2013.01)

(58) Field of Classification Search
CPC .......... B25J 5/007; B25J 9/1679; B25J 15/04; G05D 1/0212; G05D 2201/0216
USPC ................................. 700/213–214, 228, 245
See application file for complete search history.

(56) References Cited

U.S. PATENT DOCUMENTS

| | | |
|---|---|---|
| 2009/0035181 A1 | 2/2009 | Chung et al. |
| 2009/0240370 A1 | 9/2009 | Nichols et al. |
| 2009/0302795 A1 | 12/2009 | Nichols et al. |
| 2013/0280143 A1 | 10/2013 | Zucchelli et al. |
| 2015/0120050 A1 | 4/2015 | Gomi et al. |
| 2017/0217027 A1* | 8/2017 | Boucard ............... B01L 3/5085 |
| 2018/0133893 A1* | 5/2018 | Motojima ................. B25J 5/02 |
| 2018/0202908 A1 | 7/2018 | Croquette et al. |
| 2020/0122328 A1 | 4/2020 | Cantor et al. |

FOREIGN PATENT DOCUMENTS

| | | |
|---|---|---|
| WO | 2008007923 | 1/2008 |
| WO | 2016061471 | 4/2016 |
| WO | 20160178351 | 11/2016 |
| WO | 2017014999 | 1/2017 |

OTHER PUBLICATIONS

International Preliminary Report on Patentability, International Application No. PCT/US2019/016558, dated Nov. 20, 2020.

* cited by examiner

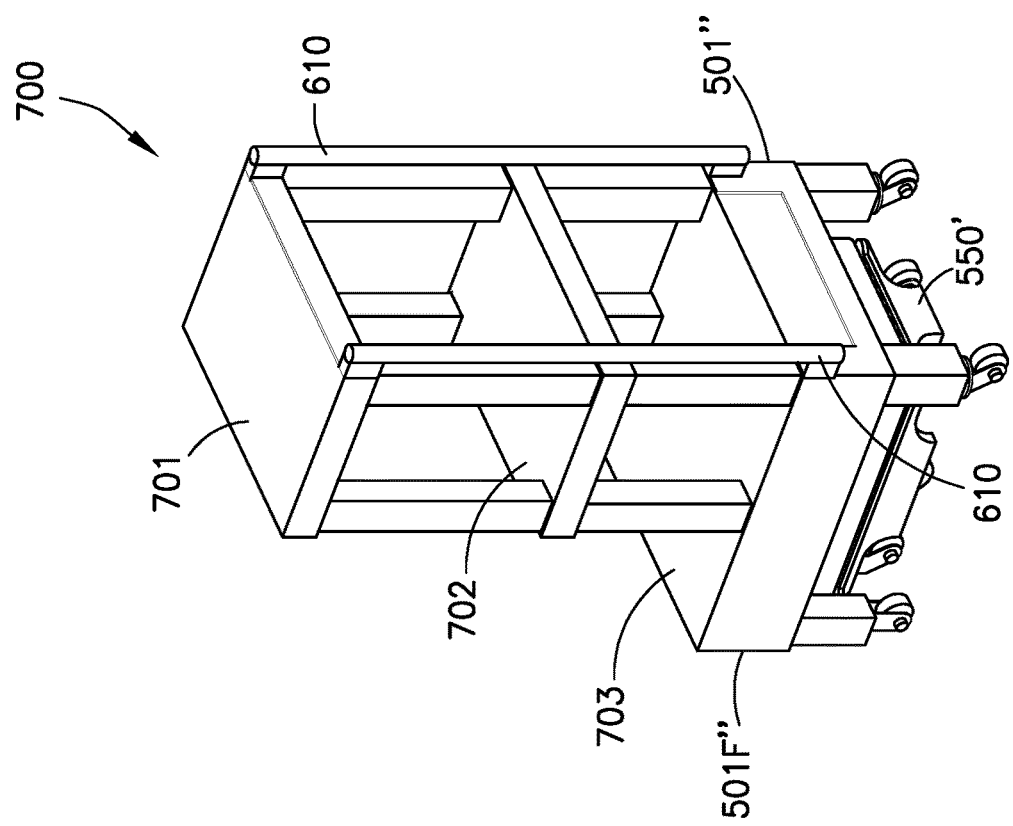
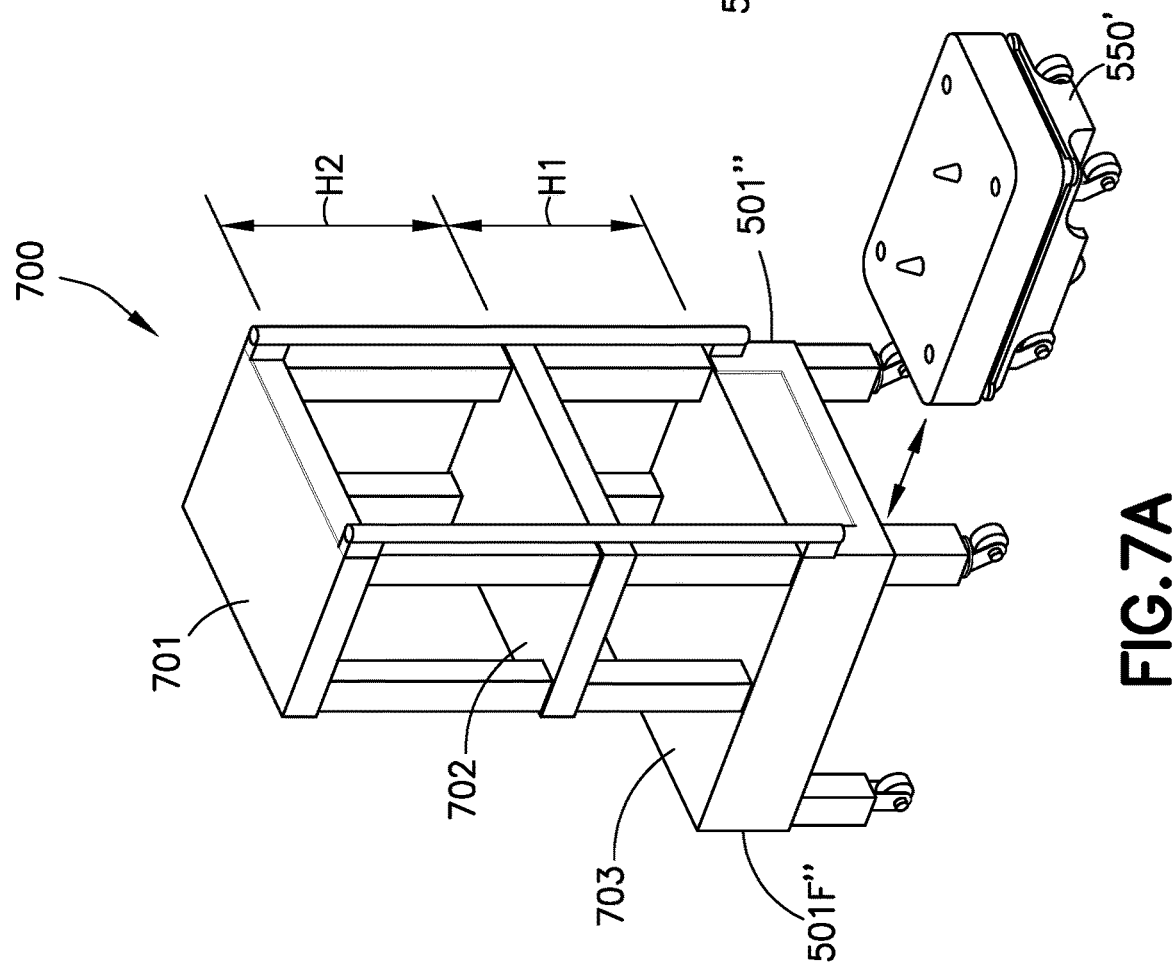

AUTO-NAVIGATING ROBOTIC PROCESSING VEHICLE

CROSS REFERENCE TO RELATED APPLICATIONS

This application is a non-provisional of and claims the benefit of U.S. provisional application No. 62/625,796, filed on Feb. 2, 2018 and related to U.S. provisional application No. 62/625,809, filed on Feb. 2, 2018, the disclosures of which are incorporated herein by reference in their entireties.

BACKGROUND

1. Field

The aspects of the disclosed embodiment described herein generally relate to life sciences equipment, and more particularly, to automated handling and processing of life sciences processing equipment.

2. Brief Description of Related Developments

High throughput screening is a well-known form of scientific experimentation in the life sciences industry which enables a research facility to conduct a large quantity of experiments at the same time. In one form of high throughput screening which is well-known in the art, a plate is provided which includes a large number of isolated, miniaturized wells (e.g., 96, 384, or 1536 wells per plate), whereby a unique compound is disposed in each well. An array of different substances is then disposed within each well where a reaction between the compound and substances may be discovered. In this manner, high throughput screening can be used to subject a particular substance to an entire library of compounds at the same time and, as a result, is highly useful in the discover of, e.g., new medicines, vaccines, and biopharmaceuticals.

High throughput screening is generally performed in an environmentally controllable enclosure which is commonly referred to as a cell or chamber. These cells may provide a researcher with an enclosed environment that is most suitable for laboratory testing. High throughput screening also, generally relies on automation to conduct assays which are otherwise repetitive in nature. Various types of laboratory automation tools are presently used in conjunction with high throughput screening.

One type of automation tool is a mobile cart that is used to carry items from one location to another within the laboratory facility. These mobile carts generally interact with other automated processing equipment and may be used to transfer laboratory samples and/or engage a processing station so that the samples carried by the mobile cart may be processed by the processing station. A robot on the mobile cart may be used to mix/stir or complete a process on the samples as well.

Chemical and Biological experiments are currently conducted in research and clinical laboratories that are either manually driven (run by people), semi-automated (operated by people with some form of automation like such as an automated pipette workstation), and fully automated platforms.

BRIEF DESCRIPTION OF THE DRAWINGS

The foregoing aspects and other features of the disclosed embodiment are explained in the following description, taken in connection with the accompanying drawings, wherein:

FIGS. 7A and 7B are schematic illustrations of an auto-navigating robotic processing vehicle in accordance with aspects of the disclosed embodiment;

DETAILED DESCRIPTION

Figure 1:
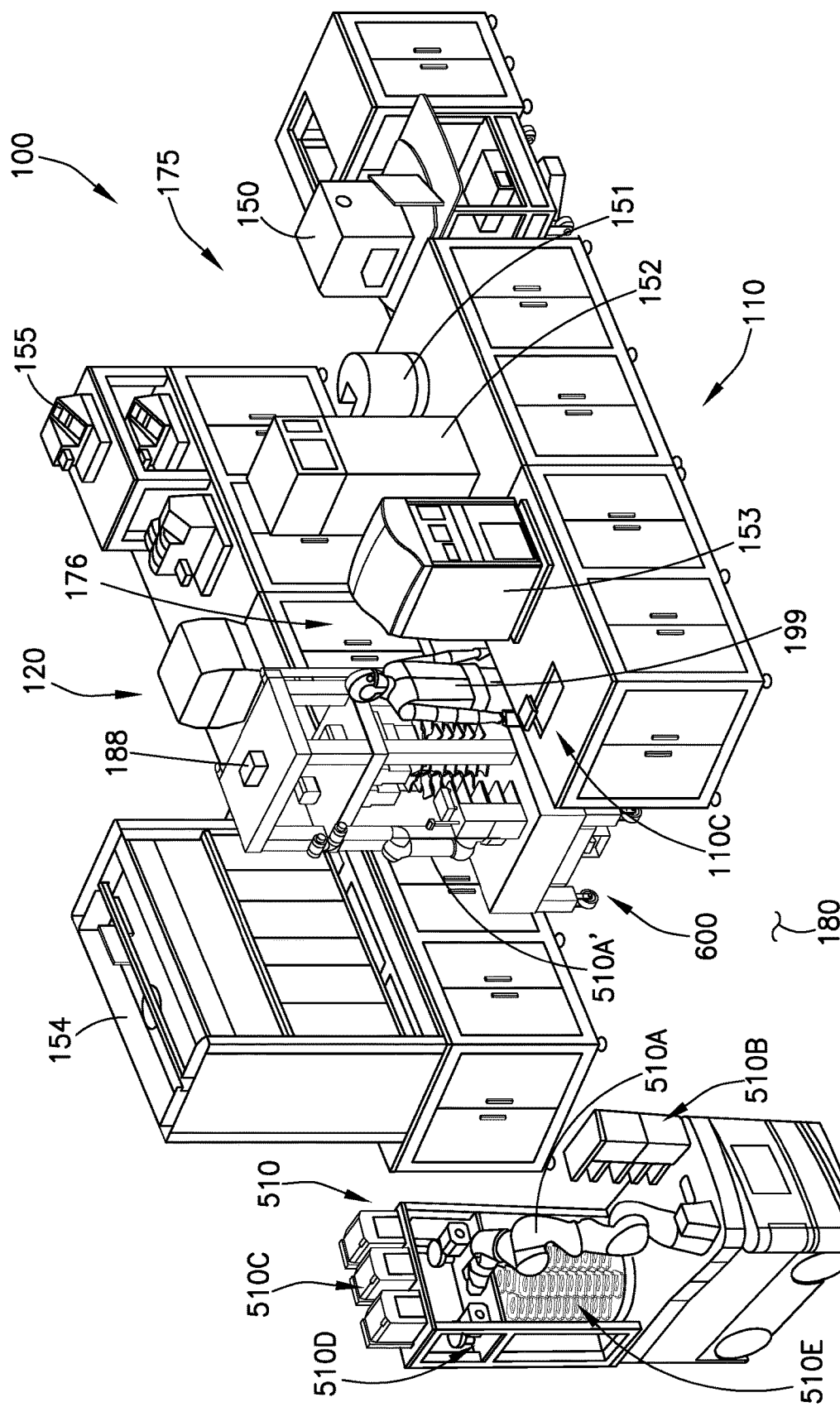
FIG. 1 is a schematic illustration of a laboratory facility in accordance with aspects of the disclosed embodiment.

FIG. 1 illustrates a laboratory facility 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

In accordance with aspects of the disclosed embodiment, the collaborative workspace described herein provides a hybrid approach of running experiments in a better way, by extending the work day for manually driven experiments by having mobile robotic operators assisting humans. It is common that lab workers will work a single shift and drive the science to an eight hour day. In accordance with aspects of the disclosed embodiment elements of the experiments may run into the evening where robotic operators can continue the work. The aspects of the disclosed embodiment may provide scheduling software that drives a fleet of robots configured to run specific biological applications (freezer operator, high throughput screening operator, general lab worker, Cell culture operator, clinical sample accessioning and many others) and instruct humans to run specific parts of the same experiments. The robots described herein are configured to run the steps of the process that make sense for automation, and humans are instructed or prompted as applicable (i.e., serially, or simultaneously, or in parallel with automation) to run elements of the process with data sent to mobile devices that are accessible to the humans.

Conventionally, manual experiments run today are often run off of an experiment definition in a lab notebook. The devices used in manual experiments do not report data and no information is captured on the timing between process steps. Two lab workers running the same experiment may load samples at different time intervals that may affect the quality of the overall experiment. It is common that there are steps that are time sensitive and materials like reagents that can spoil. Software provided in accordance with aspects of the disclosed embodiment can instruct, prompt, and/or time and capture all relevant experiment data for experiments being run by combinations of mobile robotic operators and human operators, to provide a richer history of data that can be evaluated to gauge experimental performance. If elements of the experiment do not work there will be a history of data that can be analyzed to determine if the steps of the process were correctly followed and if the timings of the experiment match the original experimental definition. In accordance with aspects of the disclosed embodiment discrepancies may be automatically flagged where experiments are being performed. Things like lab condition issues (temp or humidity), critical time events for sample preservation and instructing humans of discrepancies and other desired information associated with their experiment can propagate to mobile devices. Another benefit of the collaboration of the disclosed embodiment is that the conventional automation in laboratories can only work with automation ready devices (like an incubator with a carousel inside with software interfaces for control). The collaborative apparatus described herein in accordance with the disclosed embodiment are configured to use these automation ready devices, but also devices that are normally driven by humans. The aspects of the disclosed embodiment include a series of robotic manipulators to open instrument doors, press buttons and perform operation steps in a similar way to humans.

The laboratory facility 100 may include at least one auto-navigating robotic processing vehicle 500, 600 and at least one processing station 110, 120. The at least one processing station 110, 120 may be a human operated processing station and/or an automated processing station. As described herein, the auto-navigating robotic processing vehicles 500, 600 include a processing section 510 that has a number of different processing modules 510A-510G. Each of the different processing modules 510A-510G has a different predetermined laboratory processing function with a different predetermined function characteristic corresponding to the processing module 510A-510G. The different processing modules 510A-510G and their respective functions are automatically selectable to effect, independent of or in combination with vehicle travel, a preprocess or a preprocess condition of laboratory samples and/or sample holders with respect to a process at the at least one processing station 110, 120. For example, preprocessing conditions that may be performed by the at least one auto-navigating robotic processing vehicle 500, 600 include, but are not limited to, storage of sample trays, sample tray lids, transport and direct or indirect handoff of laboratory equipment (e.g., vacuum heads, brushes, Bunsen burners, microscopes, brooms, processing tools and/or fixtures, sample trays, etc.) to a human 199 (at a processing station 110, 120) and/or automated processing equipment at a processing station 110, 120 cleaning of an animal cage, laboratory table, etc., Examples of processes that may be performed by the at least one auto-navigating robotic processing vehicle 500, 600 include, but are not limited to, removing a sealing film from a sample and/or sample tray, reading an identification of a sample and/or sample tray, etc., pipetting fluids, capping and decapping tubes.

In one aspect, the at least auto-navigating robotic processing vehicle 500, 600 services individual processing stations 110, 120, where the processing stations 110, 120 have either automatic item (e.g., tools, samples, trays, etc.) input/output or have manual processes which are carried out/effected, monitored, and/or controlled (e.g., through a user interface) by a human 199. In one aspect, the at least one auto-navigating robotic processing vehicle 500, 600 is configured to provide all comporting (e.g., suitable) equipment (e.g., "process payloads" which may include process modules, peripherals, and/or consumables for station engagement, or "workpiece payloads" which may include samples and sample trays for station engagement) on the auto-navigating robotic processing vehicle 500, 600 to perform the tasks at a given processing station 110, 120. As an example, an auto-navigating robotic processing vehicle 500, 600 may be configured and loaded for an individual task such that all the comporting equipment is carried by a single auto-navigating robotic processing vehicle 500, 600 to complete the individual task (which may be, e.g., a process station function) in full with a single auto-navigating robotic processing vehicle 500, 600 and the items carried thereon.

Figure 5A:
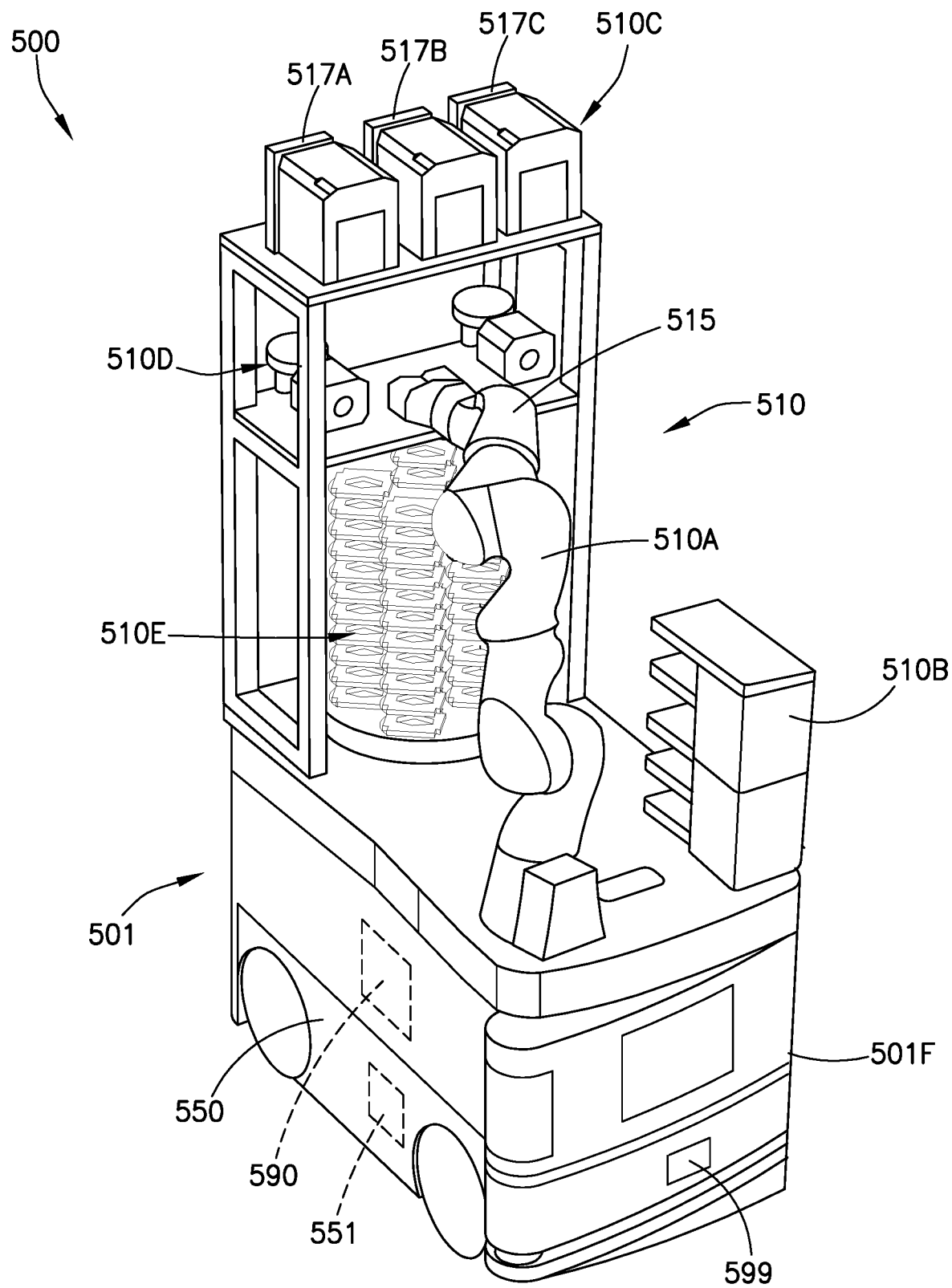
FIGS. 5A and 5B are schematic illustrations of an auto-navigating robotic processing vehicle in accordance with aspects of the disclosed embodiment.

The at least one auto-navigating robotic processing vehicle 500, 600 may also provide or otherwise generate, at each different human affectable process station 110, 120 (e.g., that has a common type of station process function, that includes one or more manual steps such as human affectable processes that include sterilization, exact timing control, climate control, temperature control, unattended use, remote control or monitoring) repeatable or "near identical" process steps (e.g., the process steps are performed with automatic machine repetition controlled by the at least one auto-navigating robotic processing vehicle's 500, 600 programmable controller 590—see FIG. 5A)).

As can be seen above, and as will be further described below, the aspects of the disclosed embodiment address the deficiencies of conventional mobile carts as well as increase the accuracy and consistency of manually affected processes within the laboratory facility 100.

Still referring to FIG. 1, the processing stations 110, 120 may be linearly arranged with one or more process tools 150-155 which may include, but are not limited to, electronic pipettes, microplate dispensers, media preparation modules (e.g., sterilization and dispensing of sample medium), environmental control modules (e.g., refrigeration, freezers, incubators, clean environments, hoods, etc.), storage modules, and centrifuges. It is noted that FIG. 1 illustrates human processing stations 110, 120 which may or not include automated processes however, the aspects of the disclosed embodiment are not limited to the human processing stations 110, 120. For example, the at least one auto-navigating robotic processing vehicle 500, 600 may also be configured to effect one or more predetermined laboratory processing function at a processing station of an automated configurable processing tool 200A. For example, the automated configurable processing tool 200A (shown for example, having a cluster configuration as described in U.S. Pat. No. 8,734,720 issued on May 27, 2014, through in other aspects the processing tool may have a linear configuration, a suitable example of which is disclosed in U.S. Patent Application No. 62/625,809 filed on Feb. 2, 2018, entitled "Robotic Processing System" and U.S. patent application Ser. No. 16/265,273, entitled "Robotic Processing System", the disclosures of which are incorporated herein by reference in their entireties), may include at least one automated unit 202A, 202B each having a multi-axis robotic arm 206 that interfaces with one or more stations 217 (in this example, mobile carts) docked with a stationary base of the multi-axis robotic arm 306 (while in other examples the auto-navigating robotic processing vehicle 500, 600 may dock with the automated configurable processing tool 200A in the same/similar manner as the mobile cart). Each automated unit 202A, 202B may include a respective controller 230. An interface station 220 may also be provided for transferring material between the at least one automated units 202A, 202B. The at least one auto-navigating robotic processing vehicle 500, 600 of the disclosed embodiment may be configured to perform a process or preprocess condition at the at least one automated unit 202A, 202B such as by providing different end effectors 270 or other tools to the multi-axis robotic arm 306, and/or performing a preprocess condition (such as those described above) at one or more of the stations 217. The auto-navigating robotic processing vehicle 500, 600 and the automated configurable processing tool 200A are communicably connected by any suitable network to the laboratory facility 100 controller 930 (as described below and shown in FIG. 9) that registers the configuration of the automated configurable processing tool 200A, a presence and configuration of the auto-navigating robotic processing vehicle 500, 600 at the automated configurable processing tool 200A or in motion from/to the automated configurable processing tool 200A, and register a location and configuration of a human processing station 110, 120 and a status (e.g., operating, occupied, closed, etc.) thereof.

Figure 3:
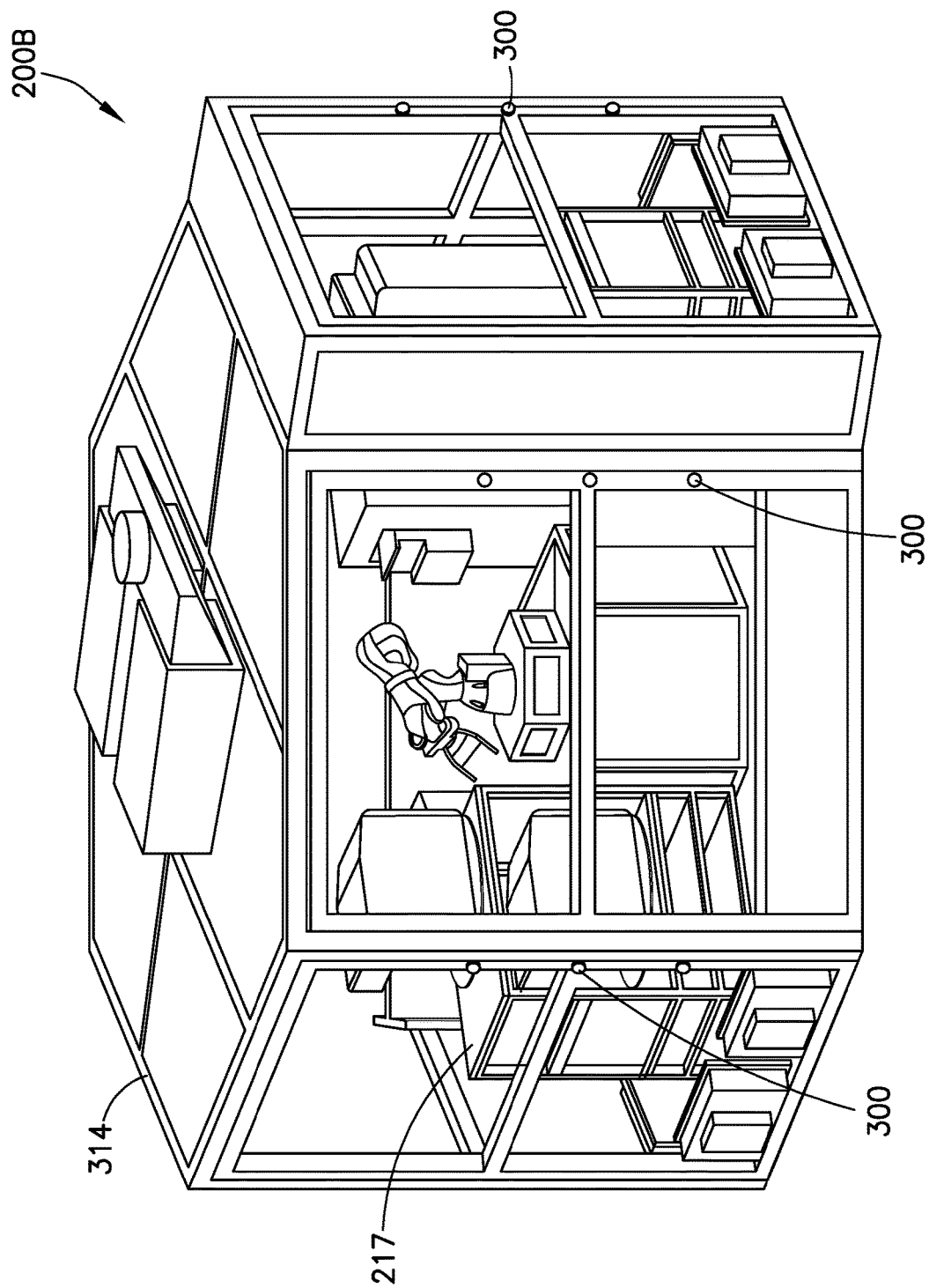
FIG. 3 is a schematic illustration of a laboratory processing station in accordance with aspects of the disclosed embodiment.
Figure 4:
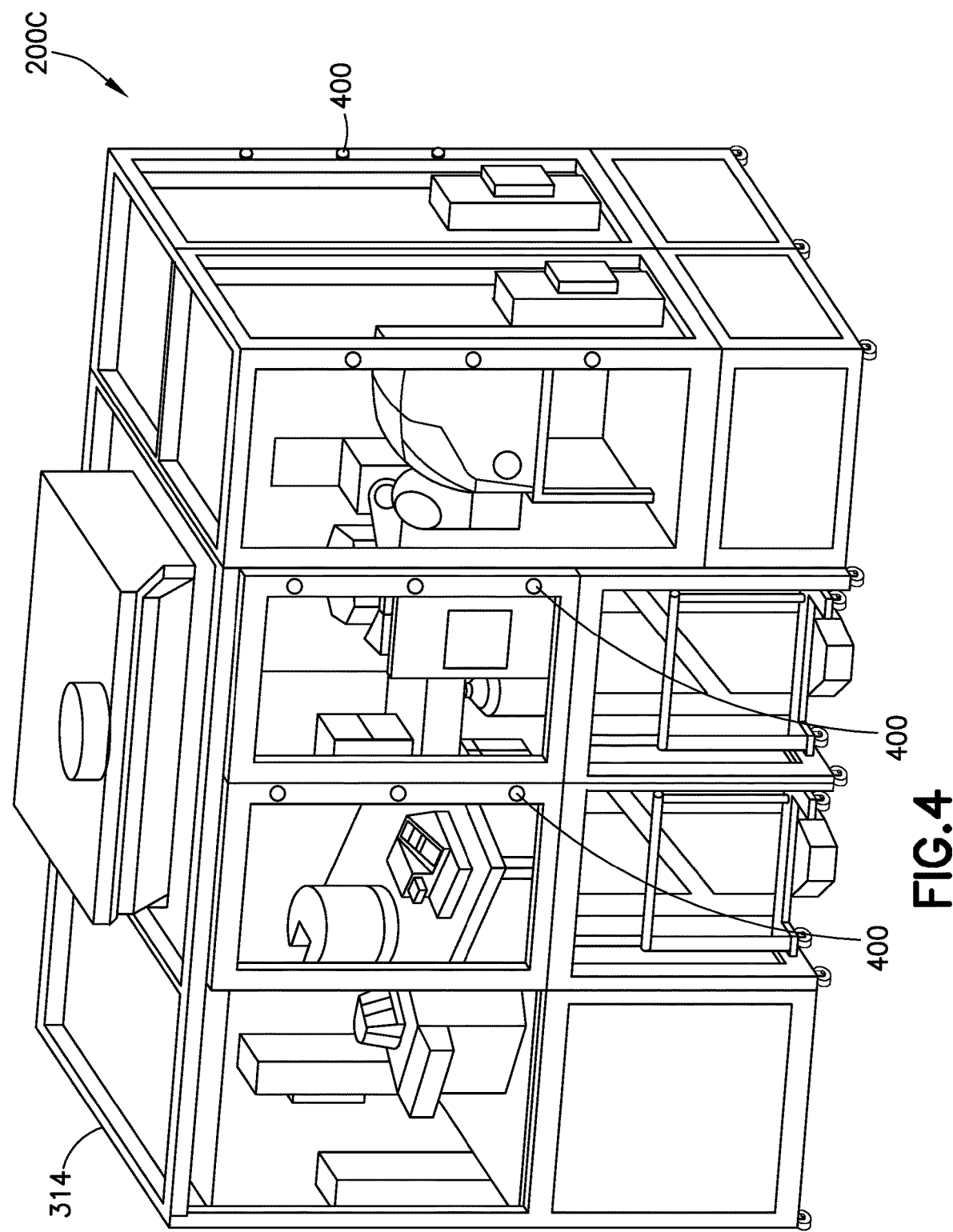
FIG. 4 is a schematic illustration of a laboratory processing station in accordance with aspects of the disclosed embodiment.

Referring also to FIGS. 3 and 4, the at least one auto-navigating robotic processing vehicle 500, 600 may also be configured to effect one or more predetermined laboratory processing function at a processing station of an enclosed cluster processing tool 200B and/or an enclosed linear processing tool 200C, such as those described in U.S. Pat. No. 8,734,720 issued on May 27, 2014, the disclosure of which was previously incorporated herein by reference in its entirety. These processing tools 200B, 200C may include one or more doors 300, 400 that, when opened, provide access to the multi-axis robotic arm and stations within the respective enclosures 314. As will be described herein, the at least one auto-navigating robotic processing vehicle 500, 600 may include a processing section that is configured to open the doors 300, 400 for providing the at least one auto-navigating robotic processing vehicle 500, 600 access to the stations and multi-axis robotic arm within the enclosure 314 so that the at least one auto-navigating robotic processing vehicle 500, 600 performs the process or preprocess condition at stations of the tools 200B, 200C. Other linear processing tools that the at least one auto-navigating robotic processing vehicle 500, 600 may interface with include those described in U.S. Pat. No. 8,795,593, issued on Aug. 5, 2014 and U.S. Pat. No. 7,560,071, issued on Jul. 14, 2009, the disclosures of which are incorporated herein by reference in their entireties.

Figure 5B:
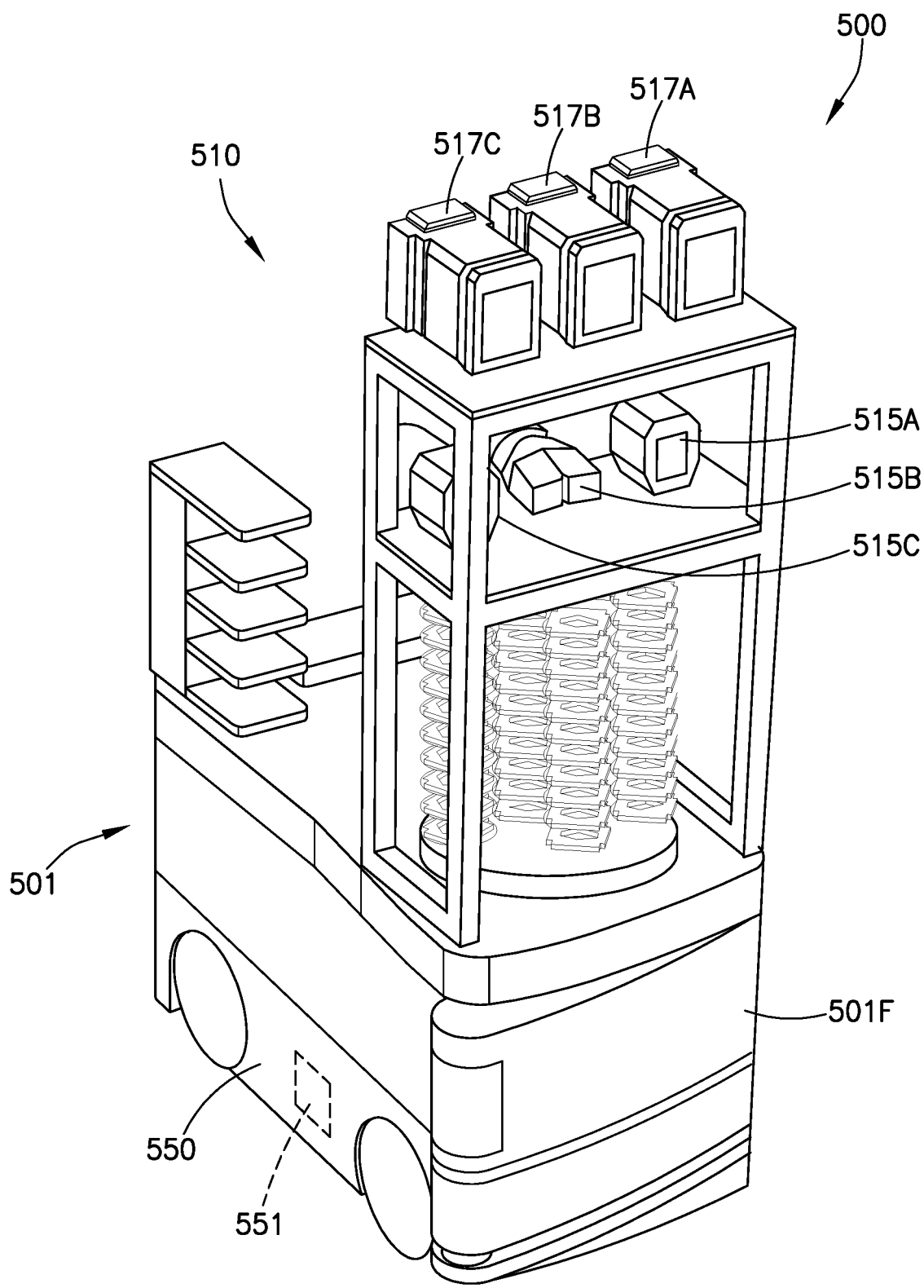

Referring to FIGS. 5A and 5B, an auto-navigating robotic processing vehicle 500 is illustrated in accordance with aspects of the disclosed embodiment. The auto-navigating robotic processing vehicle 500 includes a carriage 501 having a frame 501F, an autonomous drive section 550, a processing section 510, and a controller 590.

Figure 2:
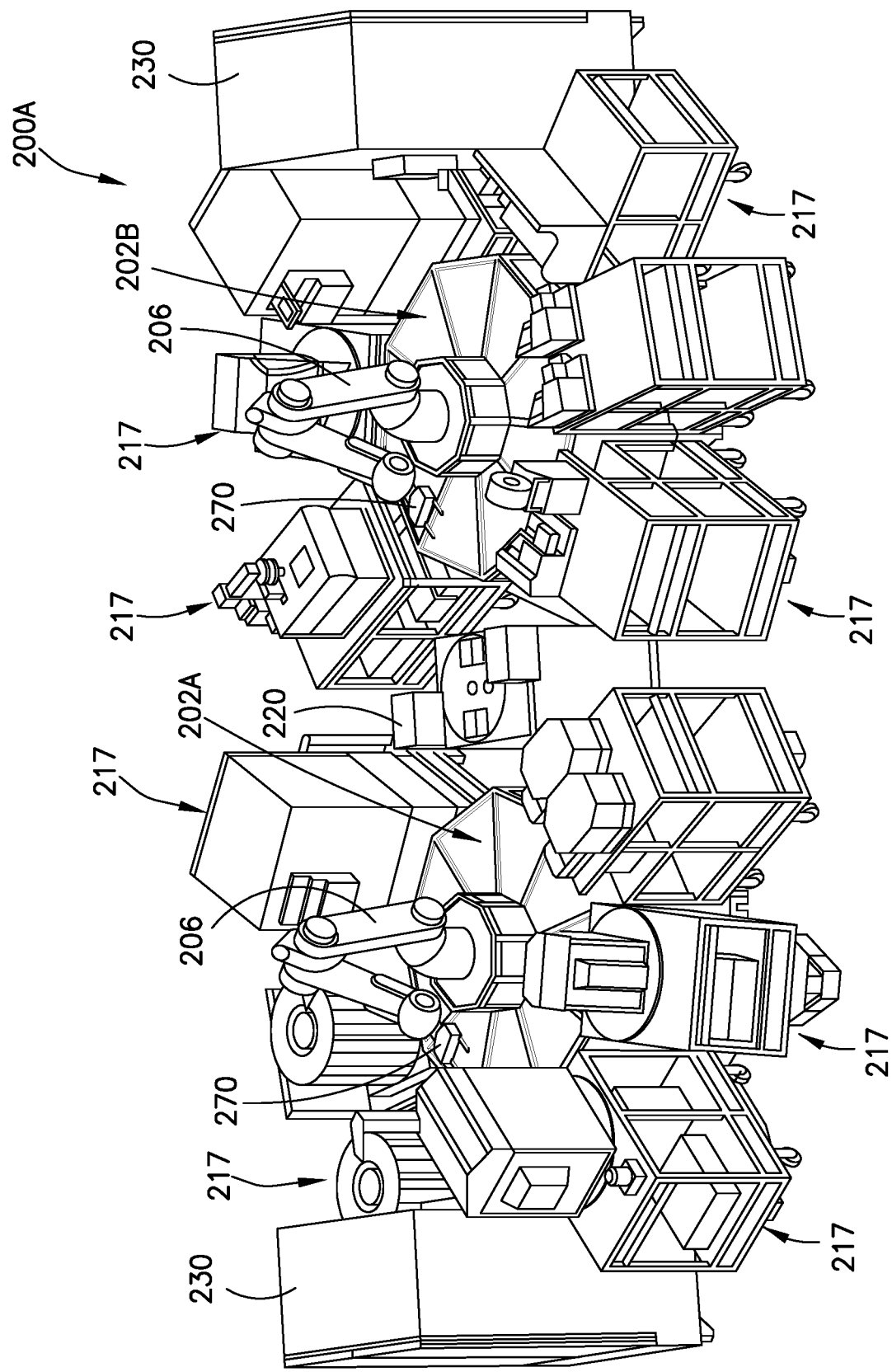
FIG. 2 is a schematic illustration of a laboratory processing station in accordance with aspects of the disclosed embodiment.

The autonomous drive section 550 is connected to the frame 501F and is configured to traverse (e.g., move) the carriage 501 effecting vehicle travel on and across a facility floor 180 (see FIG. 1), on which the at least one processing station 110, 120 (FIG. 1), and tools 200A (FIG. 2), 200B (FIG. 3), 200C (FIG. 4) including processing stations are disposed for processing laboratory samples and/or sample holders. An autonomous navigation section 551 of the auto-navigating robotic processing vehicle 500 is communicably connected to the autonomous drive section 550 so as to effect autonomous navigation vehicle travel with the autonomous drive section 550 on the facility floor 180. The autonomous navigation section 551 may include any suitable sensors (e.g., line following, inertial navigation, GPS, stereoscopic vision sensors, etc.) and/or programming so that the auto-navigating robotic processing vehicle 500 moves along the facility floor 180 and interfaces with a human 199 (FIG. 1) and/or a processing module 151-1558 of a processing station 110, 120 (FIG. 1), or tool 200A (FIG. 2), 200B (FIG. 3), 200C (FIG. 4).

In one aspect, the autonomous navigation section 551 is configured so that the auto-navigating robotic processing vehicle 500 travels to the at least one processing station 110, 120 (FIG. 1) and/or tool 200A (FIG. 2), 200B (FIG. 3), 200C (FIG. 4) through a human access zone 175 (FIG. 1) on the facility floor 180, with a human 199 present in the human access zone 175. As an example, the auto-navigating robotic processing vehicle 500 is a collaborative vehicle such that the autonomous navigation section 551, and at least portions of the processing section 510, include suitable speed controls, and any suitable sensors for detecting torque/force applied by the auto-navigating robotic processing vehicle 500 automation (e.g., the processing section 510 and/or the autonomous drive section 550) and sensing obstacles within a path of the auto-navigating robotic processing vehicle 500.

One example of collaboration between the auto-navigating robotic processing vehicle 500 and a human 199 is where the auto-navigating robotic processing vehicle 500 is configured to travel in a processing zone 176 on the facility floor 180 with the at least one processing station located 110, 120 in the processing zone 176, and a human access zone 175 is disposed in at least part of the processing zone 176 providing human access to a common portion 110C of the at least one processing station 110, 120 engaged by a robot arm 510 of the auto-navigating robotic processing vehicle 500. In one aspect, the auto-navigating robotic processing vehicle 500, via robot arm function, and the human 199 effect a collaborative function to the common portion 110C of the at least one processing station 110, 120 where the human 199 and auto-navigating robotic processing vehicle 500 work together to complete a task, such as for example, changing a pipetting head at the common portion 110C of the at least one processing station 110, 120 where the robot arm 510A hands off the pipetting head to the human 199. In another aspect, the auto-navigating robotic processing vehicle 500, via robot arm function, and the human 199 effect a common function to the common portion 110C of the at least one processing station 110, 120, such as for example, the robot arm function automatically changes the pipetting head at the common portion 110C of the at least one processing station 110, 120 while the human 199 operates the pipetting tool (with the pipetting head installed by the auto-navigating robotic processing vehicle 500) to transfer samples to/from, e.g., sample trays.

In another aspect, the autonomous navigation section 551 is configured so that the auto-navigating robotic processing vehicle 500 travels to the at least one processing station 110, 120 (FIG. 1) and/or tool 200A (FIG. 2), 200B (FIG. 3), 200C (FIG. 4) through the human access zone 175 on the facility floor 180, wherein the human access zone 175 is secured so as to block human access to the human access zone 175. In this aspect, the auto-navigating robotic processing vehicle 500 may or may not include collaborative automation, such as described above. The human access zone 175 may be secured so as to block human access in any suitable manner such as with physical barriers, light curtains (e.g., which when broken shut down the at least one auto-navigating robotic processing vehicle within the human access zone 175), etc. and include any suitable interlocks that may shut down the at least one auto-navigating robotic processing vehicle within the human access zone 175 when the interlock is not engaged.

The processing section 510 includes a number of different processing modules 510A-510G connected to and carried by the carriage frame 501F. Each of the different processing modules 510A-510G have a different predetermined laboratory processing function with a different predetermined function characteristic corresponding to the processing module 510A-510G. For example, the processing modules 510A-510G may include one or more robot arms 510A, a sample tray lid remover 510B, a pipetting head module 510C (suitable examples of pipetting heads can be found in U.S. Pat. No. 9,623,405 issued on Apr. 18, 2017 the disclosure of which is incorporated herein by reference in its entirety), an end effector processing module 510D, a sample tray carousel 510E, a bar code scanner 510F (FIG. 6A), a sample plate orientation module 510G (FIG. 6A), and/or any other suitable sample processing equipment and/or tools. The sample tray carousel 510E may be substantially similar to that described in U.S. Patent Application No. 62/625,809 filed on Feb. 2, 2018, entitled "Robotic Processing System" and U.S. patent application Ser. No. 16/265,273, entitled "Robotic Processing System", the disclosures of which were previously incorporated herein by reference in their entireties.

Figure 5C:
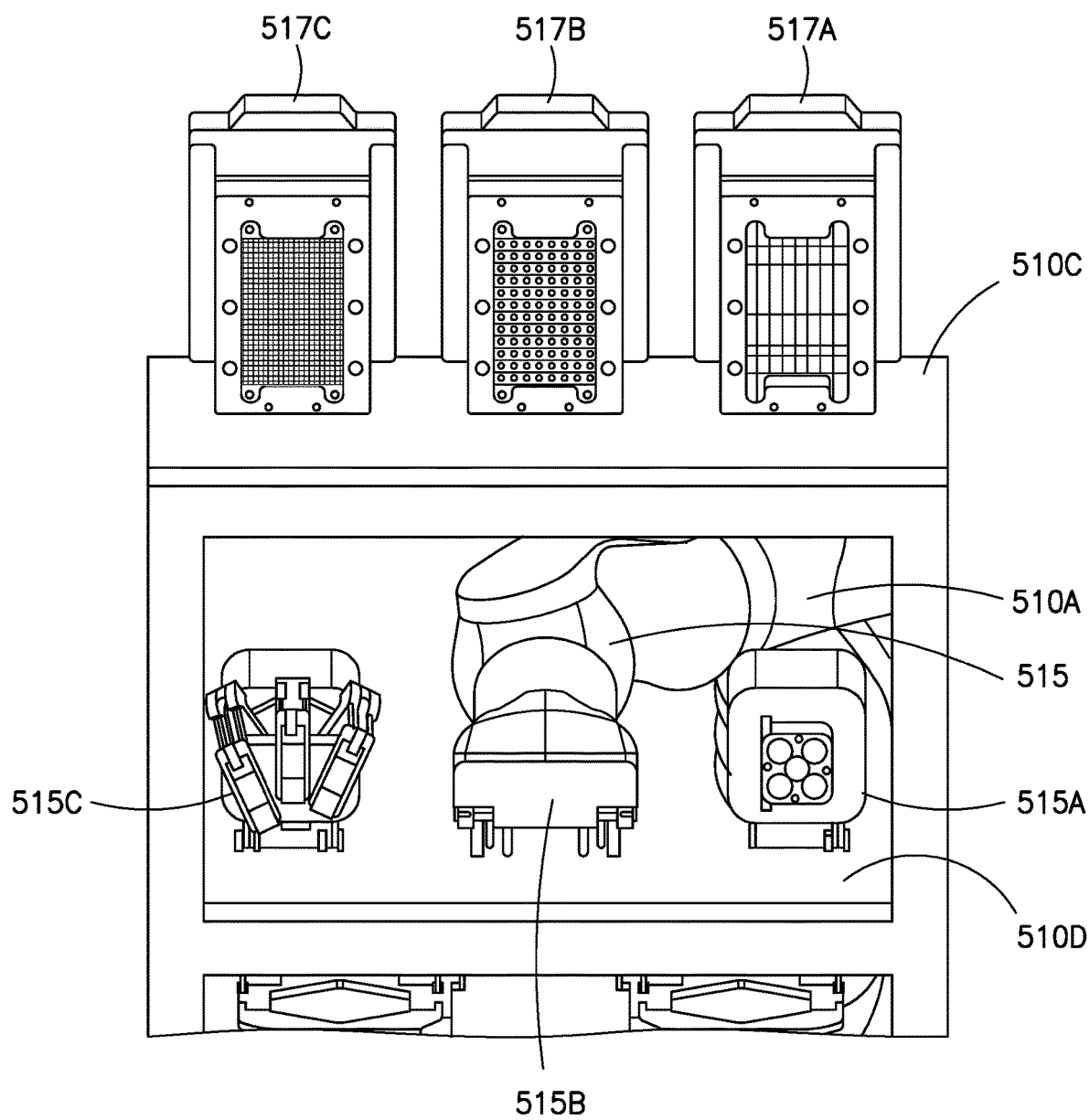
FIG. 5C is a schematic illustration of a portion of the auto-navigating robotic processing vehicle of FIGS. 5A and 5B.

Each of the different processing modules 510A-510G and their corresponding predetermined function are automatically selectable to effect automatically with the corresponding predetermined function, independent of or in combination with vehicle travel, a preprocess or preprocess condition (such as those described above) of one or more of the laboratory samples and sample holders with respect to a process at the at least one processing station 110, 120 and/or a processing station of the processing tool 200A, 200B, 200C. As an example, referring to FIGS. 5A, 5B and 5C, the robot arm 510A is mounted to the carriage frame 501F and has a robot arm end 515 with at least one independent degree of freedom with respect to the carriage frame 501F. The robot arm 510A has an automatically selectable configuration with a number of different selectable robot arm process end effectors 515A, 515B, 515C for the robot arm end 515. Each of the number of different selectable robot arm process end effectors 515A, 515B, 515C is held by an end effector processing module 510D of the carriage frame 501F, and is coupled and decoupled automatically to the robot arm end 515 on selection with the controller 590 effecting a change to the robot arm predetermined processing function. In one aspect, the robot arm may be able to pick an end effector up at a processing station. Here, the number of different selectable robot arm process end effectors 515A, 515B, 515C are configured so as to be interchangeably coupled to the robot arm end 515. The number of different selectable robot arm process end effectors 515A, 515B, 515C allow the auto-navigating robotic processing vehicle 500 to access both automation friendly devices (e.g., devices that have lab ware input/output positions and external control application processor interfaces (APIs) and non-automation friendly devices (such as manual devices generally operated by a human).

Each of the number of different selectable robot arm process end effectors 515A, 515B, 515C have a different predetermined function characteristic defining a different predetermined processing function, corresponding to the different selectable robot arm process end effector 515A, 515B, 515C, effected with the at least one degree of freedom by the robot arm end 515. For example, the automatically selectable configuration of the robot arm end 515, automatically selects one end effector 515A-515C from different selectable end effectors 515A-515C so as to change a robot arm predetermined processing function, effected with the at least one independent degree of freedom of the robot arm end, from a first robot arm predetermined processing function, defined by a corresponding function characteristic of a first of the selectable end effectors 515A-515C, to a second robot arm predetermined processing function, defined by a corresponding function characteristic of a second of the selectable end effectors 515A-515C.

In one aspect, the predetermined function characteristic, of at least one of the number of different selectable robot arm process end effectors 515A, 515B, 515C, is the at least one of the number of different selectable robot arm process end effector 515A, 515B, 515C configured as being at least one of an anthropomorphic grip type configuration (see e.g., end effector 515C), a sample tray, rack and plate grip type configuration (see, e.g., end effector 515B), and a tube grip type configuration (see, e.g., end effector 515A). In another aspect, a corresponding predetermined function characteristic of at least one of the number of different selectable robot arm process end effectors 515C is an anthropomorphic grip configuration, a corresponding predetermined function characteristic of another at least one of the number of different selectable robot arm process end effectors 515B is a sample tray, rack and plate grip configuration, and a corresponding predetermined function characteristic of a further at least one of the number of different selectable robot arm process end effectors 515A is a tube grip configuration. In one aspect, the robot arm is configured to, with the anthropomorphic grip effector, effect a preprocess condition based on the process of the at least one processing station 110, 120 (which may be or include an animal cage, lab table, etc. as described herein), wherein the robot arm 510A picks up, with the anthropomorphic grip effector 515C, a manual tool 188 (including those described herein, such as pipetting heads, brushes, Bunsen burners, microscopes, etc.) related to the process of the at least one processing station 110, 120 where the at least one processing station 110, 120 is located at a travel location of the auto-navigating robotic processing vehicle 500. In one aspect, the auto-navigating robotic processing vehicle 500 is configured to transport the manual tool 188 to the at least one processing station 110, 120 so as to automatically effect process station operation, wherein the robot arm 510A one or more of places the manual tool 188 at the at least one processing station 110, 120 and engages the manual tool 188 to the at least one processing station 110, 120 (e.g., to clean the processing station, feed animals within the processing station, etc.).

The auto-navigating robotic processing vehicle 500 is configured to access automated devices with lab ware input output positions and external control application process interfaces (APIs) as well as non-automation friendly devices that are generally accessed by humans. The different selectable robot arm process end effectors 515A, 515B, 515C allow for handling of typical life science drug discovery lab ware such as Society for Biomolecular Screening (SBS) plates and racks, burettes for aspirating and dispensing liquids, flasks, tubes, beakers, bottles, vials, lids and caps, microfluidic flow cells, petri dishes, media bags, bioreactors, etc. In one aspect, the anthropomorphic grip configuration of the end effector 515C provides access to or operation of non-automation friendly devices/tools such as by opening doors 300, 400 of processing stations (see FIGS. 3 and 4, doors on vent hoods, doors on manual freezers and incubators, accessing cell counters, manipulating microscopes, shakers, Bunsen burners, hot plates, bioreactors, brushes, etc.) for retrieving samples and/or tools for use in experiments or in preprocesses for experiments. The different selectable robot arm process end effectors 515A, 515B, 515C also allow for handling tools for other lab interactions (in addition to sample retrieval for experiments) that are generally handled by a human 199 (FIG. 1) laboratory technician, where such tools include any suitable sensors (e.g., imaging, temperature, humidity, potential of hydrogen (pH), thermal, optical, etc.), sprayers (e.g., for sanitizing laboratory devices with bleach, ethanol and other suitable solvents), gas delivery devices (e.g., for delivering gases such as vapor hydrogen dioxide and chlorine dioxide), pipette heads 517A-517C (such as single and multichannel pipette heads for acoustic fluid delivery—see, e.g., FIG. 5C), and ultraviolet lights (e.g., for liquid and gas free sterilization of surfaces). One or more of these tools may be stored on the auto-navigating robotic processing vehicle 500. For example, pipette heads 517A-517C may be stored on pipetting head module 510C.

In one aspect, the auto-navigating robotic processing vehicle 500 is configured to move between different climate zones (such as, for example, the different climate zones of enclosed processing tools 200B, 200C and the human habitation zones disposed outside of the enclosed processing tools 200B, 200C) of a facility as described in U.S. Patent Application No. 62/625,809 filed on Feb. 2, 2018, entitled "Robotic Processing System" and U.S. patent application Ser. No. 16/265,273, entitled "Robotic Processing System", the disclosure of which were previously incorporated herein by reference in their entireties. For example, the components, such as the sample tray carousel 510E may be sealed in any suitable manner for operation in any suitable climate zone. In one aspect, the carousel includes a drive section 510ED (see FIG. 6A) that may be a sealed drive section as described in U.S. Patent Application No. 62/625,809 filed on Feb. 2, 2018, entitled "Robotic Processing System" and U.S. patent application Ser. No. 16/265,273, entitled "Robotic Processing System". In other aspects, the motors of the robot(s) and other processing equipment carried on the auto-navigating robotic processing vehicle 500 may be similarly sealed.

Referring to FIGS. 1, 5A and 5B, the controller 590 is communicably connected to each different processing module 510A-510G, so as to automatically select at least one processing module 510A-510G, from the different processing modules 510A-510G, and the corresponding predetermined function of the selected at least one processing module effecting automatically the preprocess or preprocess condition based on an identification of a travel location (such as a location of a processing station on the facility floor 180) for the auto-navigating robotic processing vehicle 500 and the process of the at the at least one processing station 110, 120. In one aspect, the controller 590 is configured so as to effect the autonomous navigation vehicle travel to the identified travel location (e.g., such as the location of the processing station 110, 120 on eh facility floor 180), from an initial location (such as a charging location or any other suitable location on the facility floor 180 different from the identified location. The controller 590 may also be configured to engage and effect with a first robot arm predetermined processing function an operation defining the preprocess or preprocess condition, and with the second robot arm predetermined processing function effect a processing station operation related to the preprocess or preprocess condition. For example, the controller 590 may effect picking up a manual tool such as an ultraviolet light from the initial location or the other suitable location and transport the ultraviolet light to the processing station 110, 120 where the controller effects, with the ultraviolet light held by the robot arm 510A sanitizing of the processing station 110, 120.

In one aspect, the controller 590 is communicably connected to the robot arm 510A, so as to automatically select the automatically selectable configuration of the robot arm 510A. The controller 590 may cause the robot arm 510A to automatically select one of the different selectable robot arm process end effectors 515A-515C from the number of different selectable robot arm process end effectors 515A-515C so as to change the robot arm predetermined processing function, effected with the at least one degree of freedom by the robot arm end 515, from a first robot arm predetermined processing function, defined by a corresponding one of the predetermined function characteristic of a first of the different selectable robot arm process end effectors 515A-515C, to a second robot arm predetermined processing function, defined by a corresponding one of the predetermined function characteristic of a second of the different selectable robot arm process end effectors 515A-515C.

In one aspect, the controller 590 is configured (e.g., with any suitable non-transitory computer program code) to receive a command (from any suitable laboratory facility controller (e.g., such as a personal computer 900, a mobile device 910 and/or a tablet computer 920—see FIG. 9—as will be described below) identifying the travel location for the auto-navigating robotic processing vehicle 500, where, as noted above, the travel location corresponds to the at least one processing station 110, 120. The controller 590 may also be configured to effect the automatic change of the robot arm predetermined processing function, effecting the automatic change in the automatically selectable configuration of the robot arm 510A, from the initial predetermined processing function to the corresponding predetermined processing function from the different predetermined corresponding processing functions based on a station process function characteristic of the at least one processing station from a number of different station processing function characteristics of the at least one processing station. For example, as described above, the controller 590 may cause the robot arm end 515 to select the anthropomorphic end effect 515C so that the robot arm 510A is able to open a door at the processing station 110, 120 and then select the tube gripping end effector 515A for transferring a sample tube through the open door at the processing station 110, 120.

In one aspect, the at least one processing station 110, 120 may have different applications (which may correspond to, e.g., a preprocess and/or a preprocess condition) such as for example, general research laboratory operator/technician applications including, but not limited to, assay development, laboratory services, animal cage cleaning, mouse colony management, etc. In other aspects, the different applications may also include sample replication, sample retrieval, DNA (deoxyribonucleic acid) extraction and sequencing, cell culture operator, operator for work in BSL (biological safety level) 3 and 4 laboratories, clinical laboratory operator (including, e.g., sample accessioning and/or chemistry synthesis operator), and/or any other suitable laboratory applications. A separate auto-navigating robotic processing vehicle 500 may be provided for each of these different applications where each of the auto-navigating robotic processing vehicles 500 may have different robot arms, end effectors, shelving configurations, environmental housings, etc. than other auto-navigating robotic processing vehicles 500. For example, the auto-navigating robotic processing vehicle 500 may be configured to perform laboratory services and is equipped, as noted above, with pipetting heads 517A-517C, end effectors 515A-515C, a sample tray carousel 510E, and a sample tray lid remover 510B to perform a preprocess (e.g., removing sealing film from a tray/sample, reading a tray/sample identification, etc. as noted above) and/or a preprocess condition (tray lid removal and storage, sanitization, etc. as noted above), at the at least one processing station 110, 120. Referring also to FIGS. 5D, 6A-6E, 7A-7B, and 8A-8B other exemplary auto-navigating robotic processing vehicle configurations are illustrated.

Figure 5D:
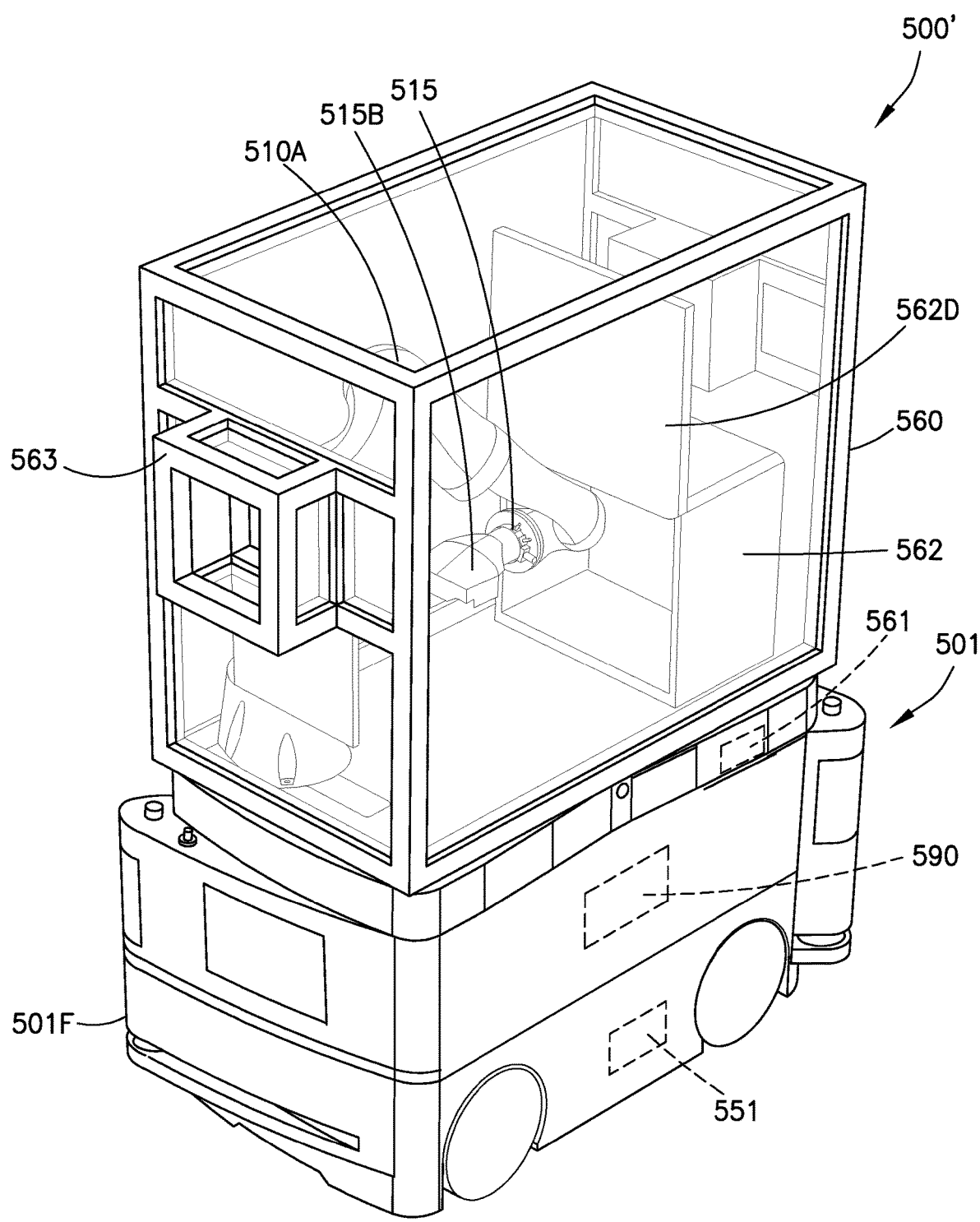
FIG. 5D is a schematic illustration of an auto-navigating robotic processing vehicle in accordance with aspects of the disclosed embodiment.

As can be seen in FIG. 5D, an auto-navigating robotic processing vehicle 500' is illustrated. The auto-navigating robotic processing vehicle 500' may be substantially similar to auto-navigating robotic processing vehicle 500 described above. However, the auto-navigating robotic processing vehicle 500' is configured to transport and/or preprocess samples/sample trays or other laboratory items in a controlled environment. For example, the auto-navigating robotic processing vehicle 500' includes an environmental housing 560 and may include any suitable environmental controls 561 (e.g., heat exchangers, fan filter units, humidifiers, de-humidifiers, etc.) for maintaining the environment within the environmental housing at one or more of, e.g., a predetermined temperature, pressure, humidity, and cleanliness level. The auto-navigating robotic processing vehicle 500' may also include a sample/tray storage unit 562 which may be a freezer, incubator, or any other suitable storage. The sample storage may include a door 562D that may be automatically opened and closed by, for example, a drive unit of the storage unit 562 or, in other aspects, by the robot arm 510A. While the robot arm end 515 is illustrated as being equipped with a sample tray, rack and plate grip type end effector configuration (see, e.g., end effector 515B), the auto-navigating robotic processing vehicle 500' may include process module 510D (see FIG. 5A) for holding the different end effectors 515A-515C to provide different functionalities to the robot arm end 515 (e.g., such as opening doors, transferring individual sample tubes, and using manually operated tools, such as those described above, within the environmental housing). The environmental housing 560 may include one or more input/output units 563 through which the robot arm 510A may transport items to and from the interior of the environmental housing 560, such as for handoff to a human 199 (see FIG. 1) or to any suitable laboratory automation.

Referring now to FIGS. 6A-6E, an auto-navigating robotic processing vehicle 600 is illustrated. The auto-navigating robotic processing vehicle 600 may be substantially similar to an auto-navigating robotic processing vehicle 500 described above but may be configured for a different processing and/or preprocessing condition application than the auto-navigating robotic processing vehicle 500. In this aspect, the auto-navigating robotic processing vehicle 600 includes carriage 501' and an autonomous drive section 550' that is separable from the carriage 501. In this aspect, the carriage 501 may be a collaborative carriage that may be moved across at least a portion of the facility floor 180 (FIG. 1) by a human 199 (FIG. 1) using any suitable handles 610 coupled to the carriage frame 501F' and/or by the autonomous drive section 550'. In this aspect, the robot arm 510A' may be different a different type of arm than the robot arm 510A of the auto-navigating robotic processing vehicle 500 such that the arms may provide a different number of degrees of freedom and/or a different type of articulated arm movement to effect the processes or preprocess conditions at the at least one processing station 110, 120. In other aspects, the robot arm of the auto-navigating robotic processing vehicle 600 may be the same arm as the arm 510A.

Figure 6A:
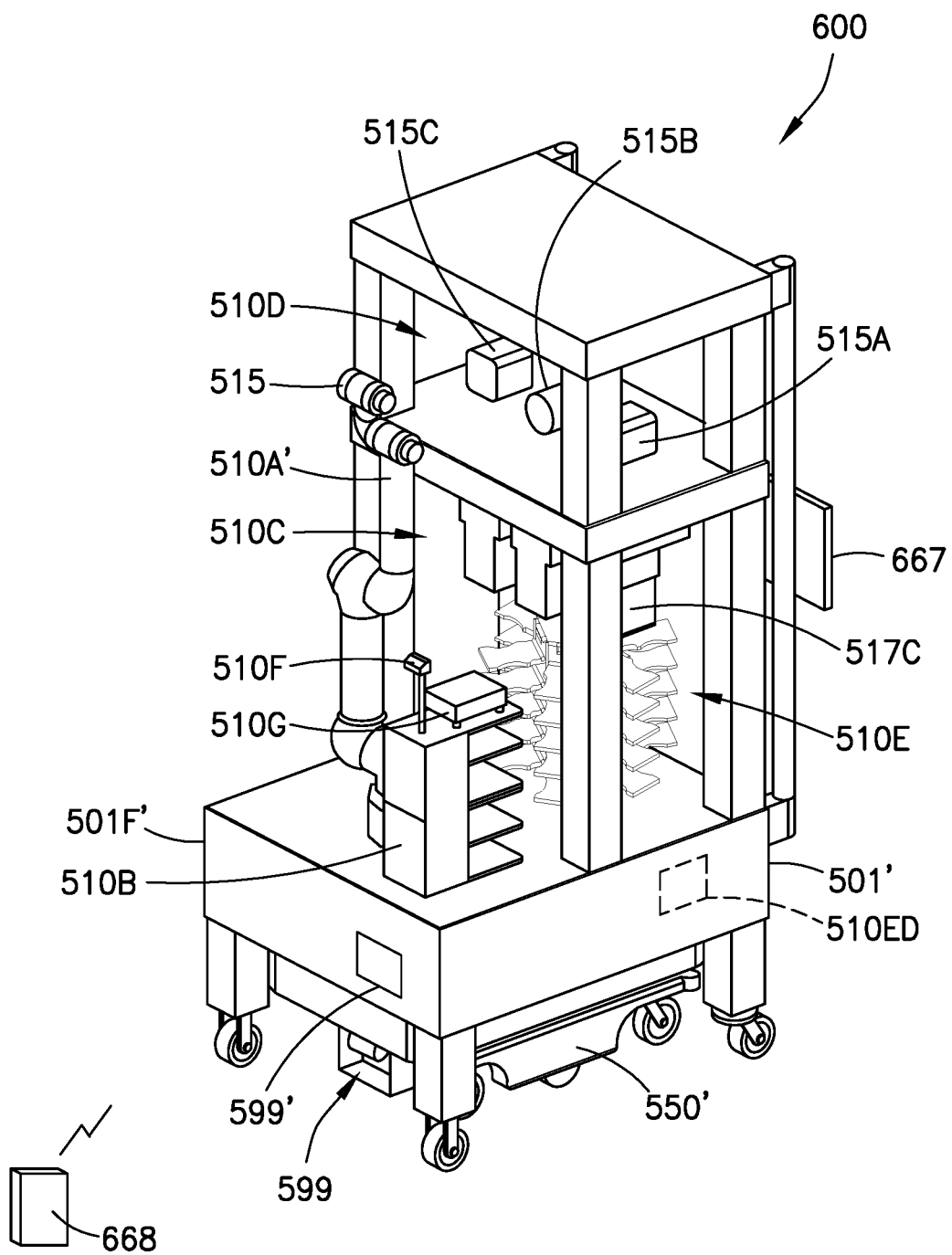
FIGS. 6A-6E are schematic illustrations of an auto-navigating robotic processing vehicle in accordance with aspects of the disclosed embodiment.
Figure 6B:
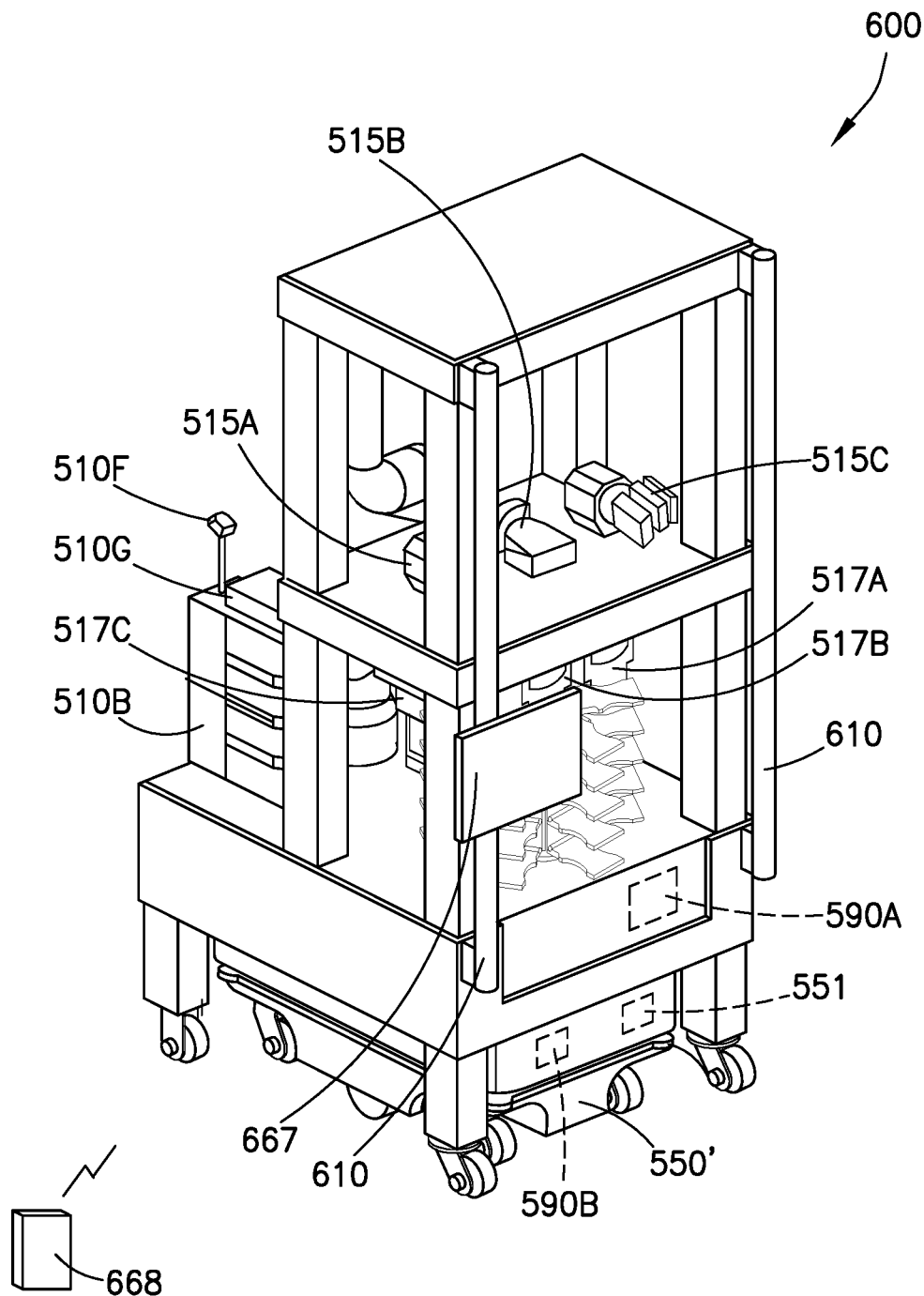
Figure 6C:
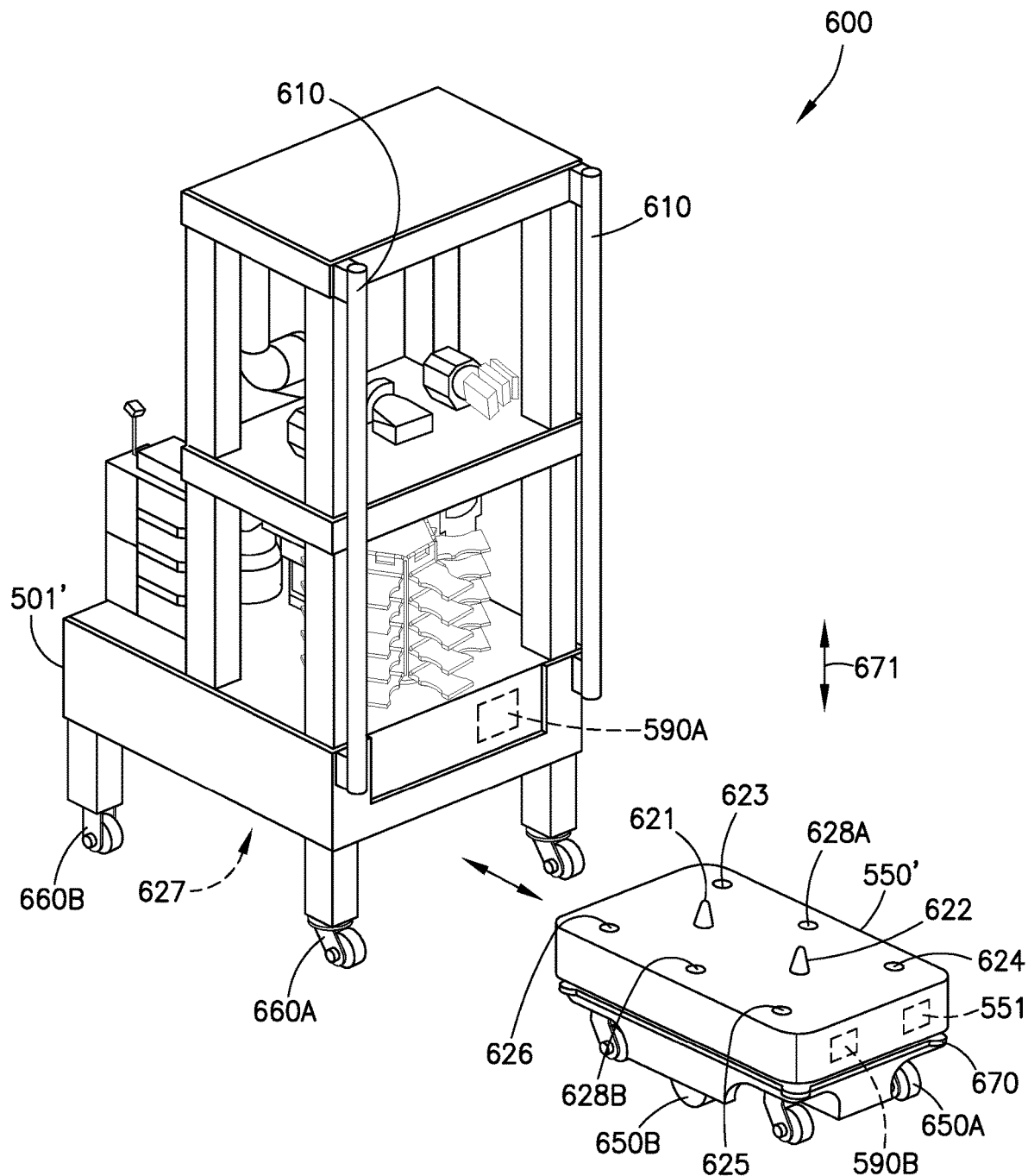
Figure 6D:
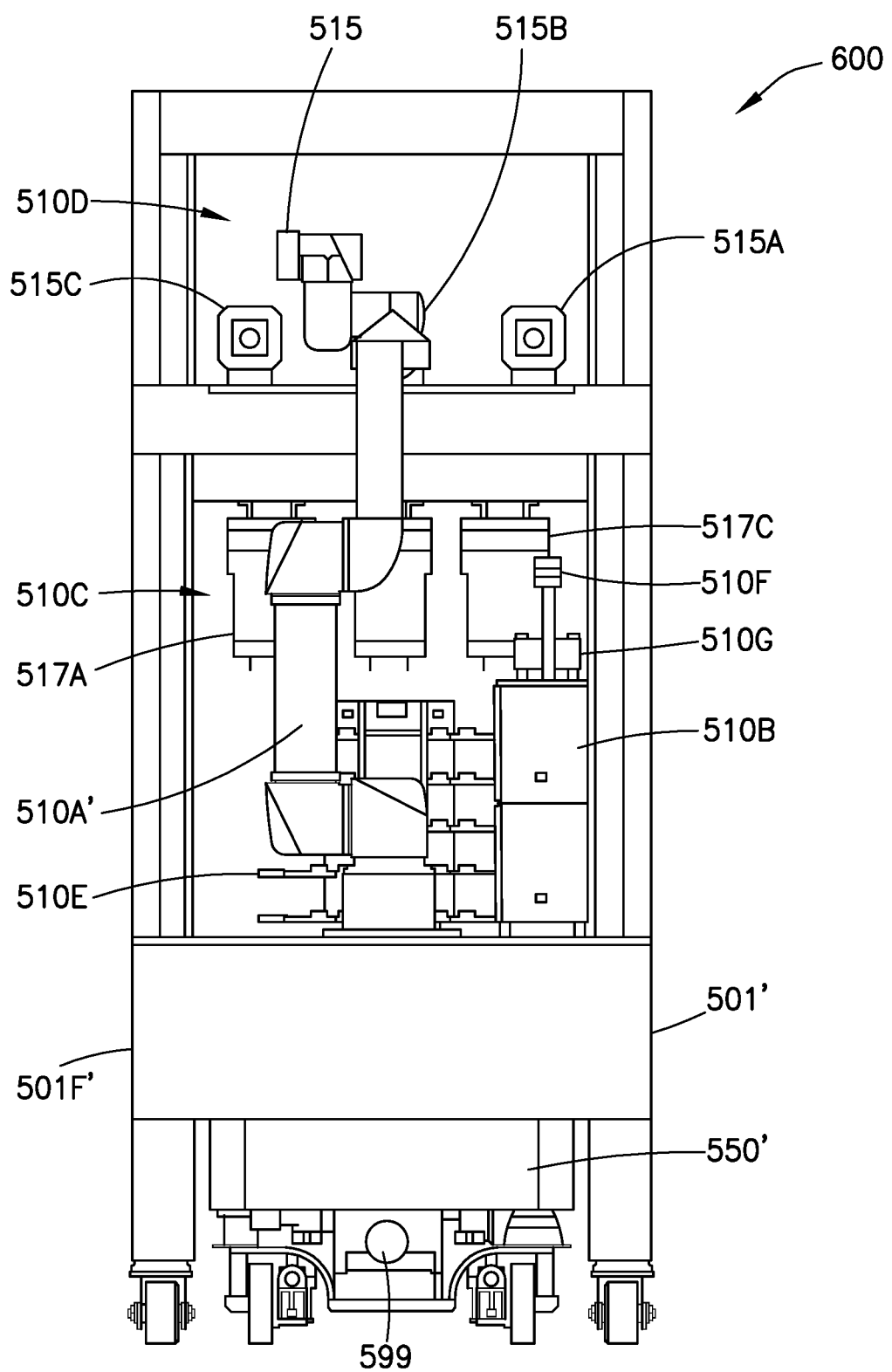
Figure 6E:
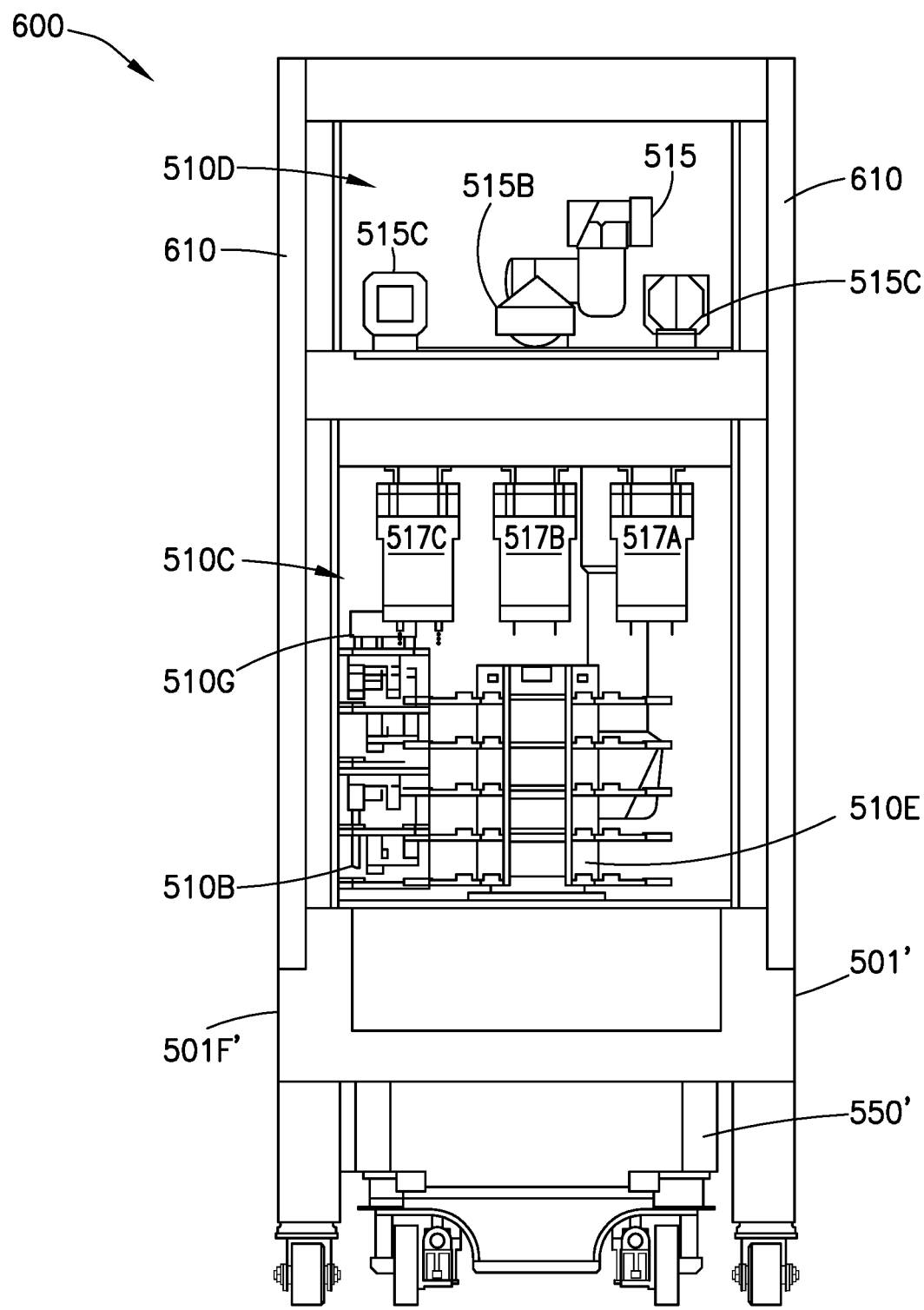

As best illustrated in FIG. 6C, the autonomous drive section includes one or more carriage engagement features 621-626 configured to couple with corresponding engagement features 627 on the underside of the carriage frame 501F'. The one or more carriage engagement features 621-626 may include kinematic couplings, electrical couplings, fluid couplings and/or any other suitable couplings that when coupled provide for one or more of movement of the autonomous drive section 550' and the carriage 501' as a unit, powering one or more of the processing modules 510A-510G, providing communication between the controller 590 and one or more of the processing modules 510A-510G and otherwise effecting a preprocess or a preprocess condition performed by one or more of the processing modules 510A-510G. In one aspect, electrical power, a fluid flow source, and control commands may be provided to the carriage 501' by the autonomous drive section 550'. In another aspect, the carriage 501' may include one or more of the power source and the fluid flow source. In one aspect, each of the carriage 501' and the autonomous drive section 550' may include a controller 590A, 590B that may communicate with each other or operate independent of each other for traversing the carriage 501' along the facility floor 180 and for operating one or more of the processing modules 510A-510G.

The autonomous drive section 550' includes any combination of at least a pair of drive wheels 650B and any suitable number of caster wheels 650A. The carriage 501' includes a pair of fixed (e.g., non-pivotable about a vertical axis) wheels 660B and a pair of caster (e.g., pivotable about a vertical axis) wheels 660A (or any suitable combination of fixed wheels and caster wheels, or all caster wheels, or all fixed wheels). The autonomous drive section 550' may be configured such that coupling engagement between the autonomous drive section 550' and the carriage 501' does not lift the wheels 660A, 660B of the carriage 501' off of the facility floor 180. Here the weight of the carriage 501' may be supported at least in part by the wheels 660A, 660B of the carriage 501' when the autonomous drive section 550' is coupled to the carriage 501'. The wheels 660A, 660B of the carriage 501' and the wheels 650A, 650B of the autonomous drive section 550' may be configured to allow the autonomous drive section 550' to traverse the carriage 501' along the facility floor 180 in straight line movement, around corners or along any other suitable path of movement. In one aspect the wheels may be configured to allow the autonomous drive section to pivot the carriage 501' substantially without linear traverse of the carriage 501'.

In one aspect, the autonomous drive section 550' may include a coupling feature drive 670 that moves the coupling features 621-626 in direction 671 towards and away from the carriage 501' for coupling and decoupling with the corresponding coupling features 627 of the carriage 501'. In other aspects, coupling between the coupling features 621-626 and the corresponding coupling features 627 may be performed in any suitable manner (e.g., such as with actuated clamps, pins, etc.). In one aspect, the autonomous drive section 550' includes any suitable sensors 628A, 628B for detecting any suitable features of the carriage 501' for aligning the coupling features 621-626 and the corresponding coupling features 627 (e.g., through movement of the autonomous drive section 550').

Referring now to FIGS. 7A-7B another auto-navigating robotic processing vehicle 700 is illustrated in accordance with aspects of the disclosed embodiment. The auto-navigating robotic processing vehicle 700 may be substantially similar to the auto-navigating robotic processing vehicle 600 described above but may be configured for a different processing and/or preprocessing condition application than the auto-navigating robotic processing vehicle 600 (as well as vehicle 500). For example, in this aspect the carriage 501", having frame 501F", may or may not include a robotic arm. The carriage 501" may include one or more shelves 701-703 upon which any suitable laboratory equipment and/or tools (such as those described above) may be placed to form process modules of the auto-navigating robotic processing vehicle 700. In this aspect, the spacing H1, H2 between the shelves 701-703 may be different than the spacing between the shelves that form (in combination with the laboratory equipment disposed thereon) the process modules 510A-510G of the auto-navigating robotic processing vehicle 600. This provides for an arrangement of laboratory equipment and/or tools on the carriage 501" of the auto-navigating robotic processing vehicle 700 that is different than that of the auto-navigating robotic processing vehicles 500, 600 where the different arrangements of laboratory equipment and/or tools are each tailored to a predetermined application of the auto-navigating robotic processing vehicle 700 at the at least one processing station 110, 120.

Figure 8B:
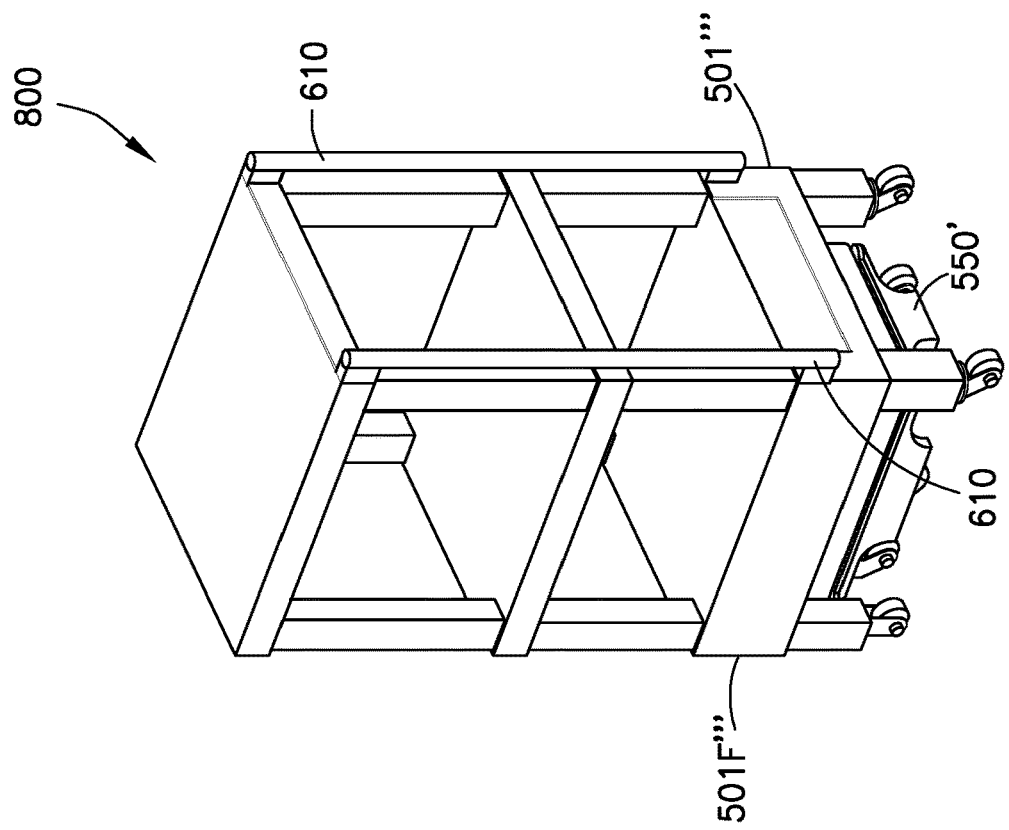
FIGS. 8A and 8B are schematic illustrations of an auto-navigating robotic processing vehicle in accordance with aspects of the disclosed embodiment.
Figure 8A:
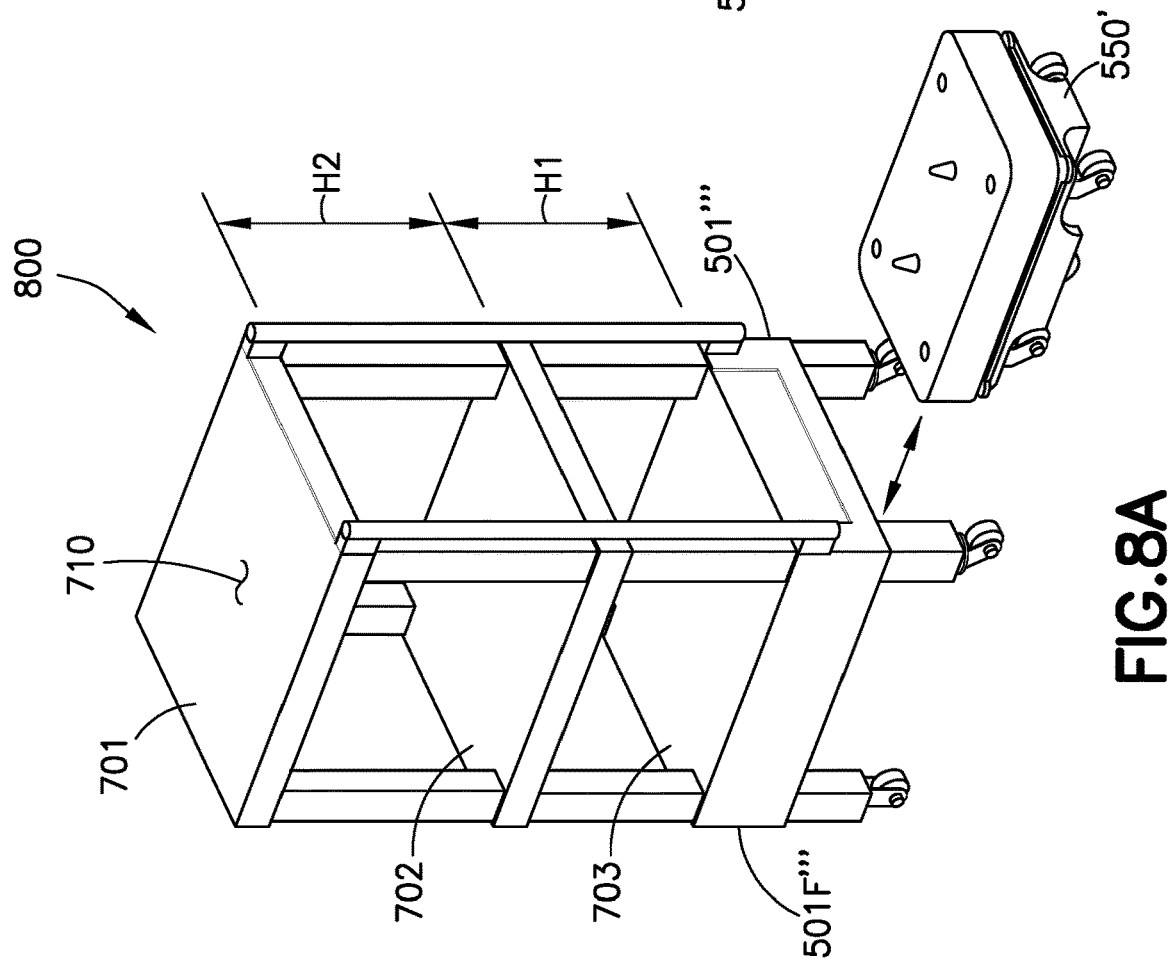

Referring to FIGS. 8A and 8B, yet another auto-navigating robotic processing vehicle 800 is illustrated in accordance with aspects of the disclosed embodiment. The auto-navigating robotic processing vehicle 800 may be substantially similar to the auto-navigating robotic processing vehicle 700 described above but may be configured for a different processing and/or preprocessing condition application than the auto-navigating robotic processing vehicle 700 (as well as vehicles 500, 600). For example, in this aspect the carriage 501'", including frame 501F'", has one or more shelves 701'-703' that may have an area 710 (e.g., a length and width) that is different than the area of the shelves 701-703 of the auto-navigating robotic processing vehicle 600. In this aspect, the spacing H1, H2 between the shelves 701'-703' may be the same or different than the spacing between the shelves of the auto-navigating robotic processing vehicle 700. This provides for an arrangement of laboratory equipment and/or tools on the carriage 501'" of the auto-navigating robotic processing vehicle 800 that is different than that of the auto-navigating robotic processing vehicles 500, 600, 700 where, as noted above, the different arrangements of laboratory equipment and/or tools are each tailored to a predetermined application of the auto-navigating robotic processing vehicle at the at least one processing station 110, 120.

As noted above, the autonomous drive section 550' of the auto-navigating robotic processing vehicles 600, 700, 800 is separable from the respective carriage 501', 501", 501'". The separability of the autonomous drive section 550' allows for both automated traverse of the carriage 501', 501", 501'" along the facility floor 180 and manual traverse of the carriage 501', 501", 501'" along the facility floor 180 without the autonomous drive section 550' coupled to the carriage 501', 501", 501'". It is also noted that the wheel configuration of the auto-navigating robotic processing vehicles 600, 700, 800 may also provide for manual traverse of the carriage 501', 501", 501'" with the autonomous drive section 550' coupled to the carriage 501', 501", 501'".

In one aspect, the auto-navigating robotic processing vehicles 500, 600, 700, 800 may include one or more docking ports 599, 599' that are configured to couple the auto-navigating robotic processing vehicles 500, 600, 700, 800 to the at least one processing station 110, 120. In one aspect, the one or more docking ports 599, 599' may be substantially similar to that described in U.S. Pat. Nos. 7,560,071, 8,734,720, and 8,795,593 previously incorporated by reference herein in their entireties. The docking ports 599, 599' may be configured to couple with the at least one processing station 110, 120 for transferring at least power to the auto-navigating robotic processing vehicles 500, 600, 700, 800. In the case of the auto-navigating robotic processing vehicles 600, 700, 800 the carriage 501', 501", 501'" may include a docking port 599' that couples with the at least one processing station 110, 120 independent of the docking port 599 of the autonomous drive section 550'. In other aspects, the docking port 599 of the autonomous drive section 550' of the auto-navigating robotic processing vehicles 600, 700, 800 may be common to both the carriage 501', 501", 501'" and the autonomous drive section 550'. In one aspect, the power transfer from the at least one processing station 110, 120 to the auto-navigating robotic processing vehicles 500, 600, 700, 800 charges a battery of at least the autonomous drive section 550' to effect traverse of the auto-navigating robotic processing vehicles 500, 600, 700, 800 along the facility floor 180 and operation of the processing modules 510A-510G of the respective auto-navigating robotic processing vehicles 500, 600, 700, 800.

In one aspect, the docking of the auto-navigating robotic processing vehicles 500, 600, 700, 800 with at least one the processing station 110, 120 may be a manual docking (such as with a human 199 moving the auto-navigating robotic processing vehicles 600, 700, 800 using the handles 610), an automated docking using the autonomous drive section 550, 550' (and any suitable sensors of the auto-navigating robotic processing vehicles 500, 600, 700, 800) or a hybrid docking that includes combination of manual and automated manipulation of the auto-navigating robotic processing vehicles 500, 600, 700, 800 at the at least one processing station 110, 120. While docking between the auto-navigating robotic processing vehicles 500, 600, 700, 800 and the at least one processing station 110, 120 is described herein, it should be understood that the auto-navigating robotic processing vehicles 500, 600, 700, 800 need not dock with the at least one processing station 110, 120 to carry out the process and/or the preprocess conditions described herein.

Figure 9:
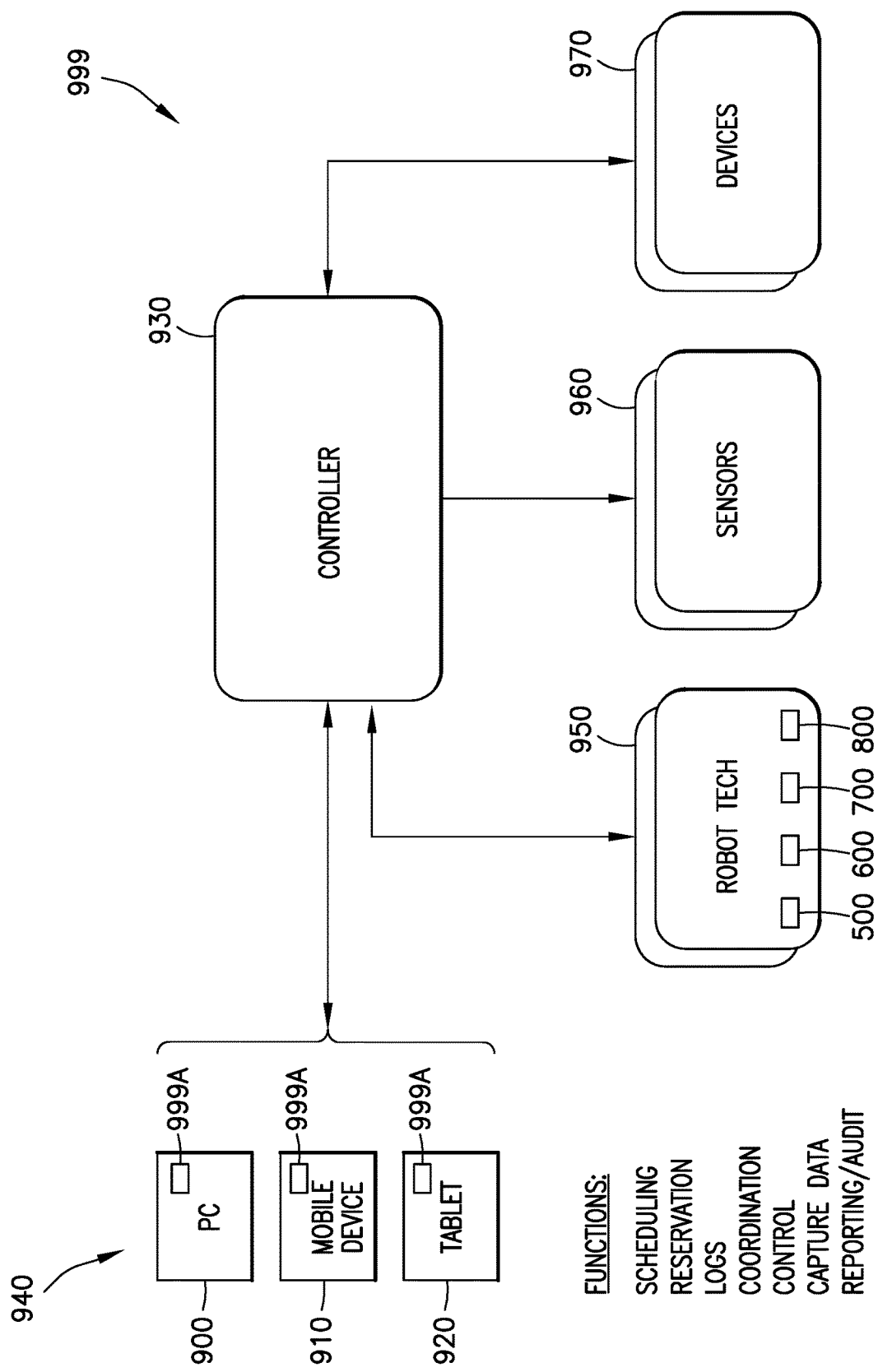
FIG. 9 is an exemplary flow diagram illustrating a control system of the laboratory facility of FIG. 1 in accordance with aspects of the disclosed embodiment.

Referring now to FIG. 9, an exemplary flow diagram of a control system 999 of the laboratory facility 100 is illustrated. The control system 999 includes any suitable controller 930 that includes any suitable non-transitory computer program code for carrying out the operations of the laboratory facility. The control system 999 also includes one or more user interfaces 940 (e.g., personal computers 900, mobile devices 910 such as smart phones, and/or tablet computers 920) coupled to the controller 930 in any suitable manner (e.g., such as through wired or wireless connections). The one or more user interfaces each include an application program interface 999A of the controller 930.

The controller 930 is also coupled to any suitable robot technology 950 of the laboratory facility 100 in any suitable manner (e.g., such as through a wired or wireless connection). The robot technology may include the auto-navigating robotic processing vehicles 500, 600, 700, 800 as well as any suitable robot arms or other automation disposed at the at least one processing station 110, 120. Any suitable laboratory sensors 960 (e.g., humidity sensors, temperature sensors, seismic sensors, optical sensors, motion sensors, etc.) may also be coupled (e.g., through a wired or wireless connection). The laboratory sensors 960 may provide the controller 930 with information so that the controller may, as non-limiting examples, adjust environmental conditions within at least a part of the laboratory facility 100, inform laboratory technicians of movement (e.g., animal movement, seismic activity, etc.) within the laboratory facility 100 and/or provide remote monitoring, such as with the one or more user interfaces, a of laboratory process. The controller 930 may further be coupled to any suitable laboratory devices 970 (e.g., microscopes, sample carousels, freezers, incubators, etc.) to provide for remote monitoring of, remote control of and/or data collection from the laboratory devices 970.

As described above, the user interfaces 940 each include an application program interface 999A of the controller 930. The application program interface 999A may be accessible from non-transitory computer code resident on the user interfaces 940 or in any other suitable manner such as through a web-browser. The application program interface 999A may be configured so that laboratory technicians may define experiments/processes, submit requests for a new job for a defined process, monitor a status of a running job, review data from completed jobs, perform error recovery, review data generated by laboratory software and systems, and/or control any devices 970 connected to the controller 930. The The control system 999 may also be configured, such as through the controller 930 and user interfaces 940, to schedule operations of human 199 lab technicians and/or schedule operations of the auto-navigating robotic processing vehicles 500, 600, 700, 800 where the operations of the human 199 and the auto-navigating robotic processing vehicles 500, 600, 700, 800, in one aspect, are coordinated with each other. The sensors 960 may provide the control system 999 with the efficiency monitoring capability so that the efficiencies of the humans 199 and the auto-navigating robotic processing vehicles 500, 600, 700, 800 may be monitored and laboratory processes may be optimized with respect to whether a human 199 or the auto-navigating robotic processing vehicles 500, 600, 700, 800 should perform one or more tasks of the laboratory processes. The control system 999 may also facilitate, such as through the user interfaces 940 and controller 930, reservation of any suitable laboratory equipment (including, but not limited to, processing stations 110, 120, devices 970 and vehicles 500, 600, 700, 800), the generation of system/data logs, and reporting/auditing.

In one aspect, as illustrated in FIGS. 6A and 6B, the vehicles 500, 600, 700, 800 may include any suitable graphical user interface 667, such as a touch screen monitor, mounted to or integrated into the vehicle 500, 600, 700, 800. The graphical user interface is configured to indicate a status and order of an experiment or test to human users in the laboratory. For example, a lab resource on the vehicle 500, 600, 700, 800 (or off the vehicle) may start the experiment or test where the vehicle 500, 600, 700, 800 is staged to complete work with the robot, and where the graphical user interface indicates at least the work performed, the order of the work to be performed and/or status of the work. The graphical user interface 667 may be configured to provide any suitable status and work orders to a human user, receive input from the user, and otherwise interact with the user to perform any suitable experiments or tests collaboratively with the vehicle 500, 600, 700, 800. The graphical user interface may be configured for one or more of visual and audible output and one or more of visual and audible input. In addition to or in lieu of the graphical user interface 667 mounted to or integrated into the vehicle 500, 600, 700, 800, a remote graphical user interface 668 may be wirelessly coupled to the vehicle 500, 600, 700, 800 (or wired to the vehicle 500, 600, 700, 800) where the remote graphical user interface operates in a manner similar to that described above with respect to the graphical user interface 667. The remote graphical user interface 668 may be any suitable handheld device such as a personal data assistant (PDA), smart phone, or other smart device accessible to the human user. Here a human user may interact with more than one vehicle 500, 600, 700, 800 with a common remote graphical user interface 668.

The controller 930 is configured to direct the auto-navigating robotic processing vehicle 500, 600, 700, 800 to a processing station 110, 120. The controller 930 is also configured to direct the auto-navigating robotic processing vehicle 500, 600, 700, 800 to move to a different processing station 110, 120 or change processing stations 110, 120. The controller 930 may also register the arrival and departure of the auto-navigating robotic processing vehicle 500, 600, 700, 800 to/from the processing stations 110, 120 and configured/reconfigure operating commands of the auto-navigating robotic processing vehicle 500, 600, 700, 800. The controller 930 may track or otherwise communicate with the processing stations 110, 120 and send instructions to a human at the processing stations 110, 120 through a graphical user interface at the processing stations 110, 120, such as the graphical user interface 667 of the auto-navigating robotic processing vehicle 500, 600, 700, 800. The human at the processing stations 110, 120 may likewise provide input at the graphical user interface informing the controller 930 of work performed by the human.

Figure 10:
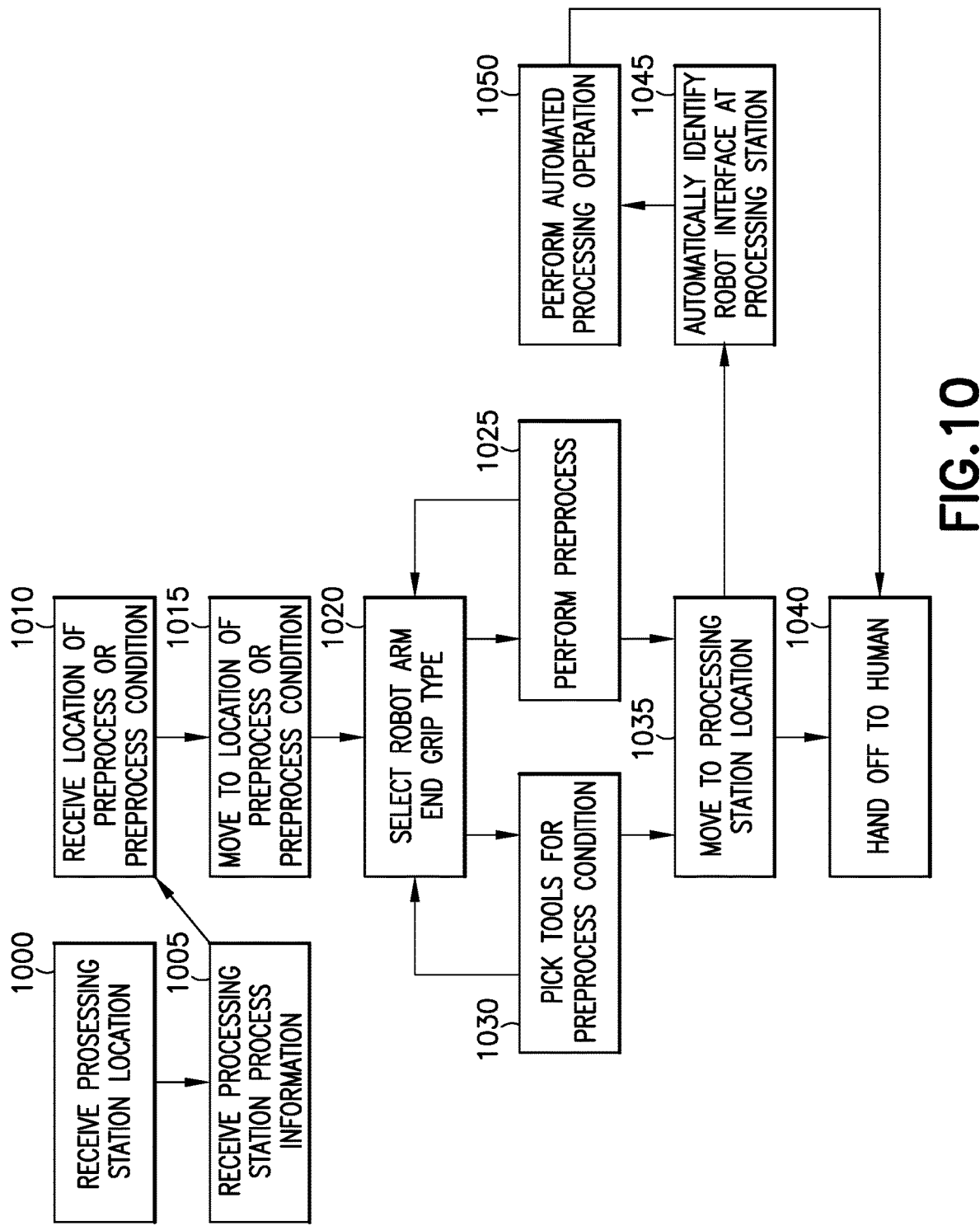
FIG. 10 is a schematic flow diagram of a method in accordance with aspects of the disclosed embodiment.

Referring now to FIGS. 1, 5A, 5B, 6C, 9 and 10, an exemplary operation of the laboratory facility 100 will be described. The auto-navigating robotic processing vehicle 500, 600, 700, 800 receives a processing station location (FIG. 10, Block 1000) from, for example, the controller 930. The auto-navigating robotic processing vehicle 500, 600, 700, 800 may also receive processing station process information (FIG. 10, Block 1005) from the controller 930. Along with the processing station location and information, the auto-navigating robotic processing vehicle 500, 600, 700, 800 may receive a location of a preprocess (such as those described above) and/or preprocess condition (such as those described above) (FIG. 10, Block 1010). The auto-navigating robotic processing vehicle 500, 600, 700, 800 may traverse the facility floor 180, such as with the autonomous navigation section 551 of the autonomous drive section 550, so that the auto-navigating robotic processing vehicle 500, 600, 700, 800 is positioned at the location of the preprocess and/or preprocess condition (FIG. 10, Block 1015). Where the auto-navigating robotic processing vehicle 500, 600 is equipped with a robot arm 510A, 510A', the controller 590 (or 590A, 590B) of the auto-navigating robotic processing vehicle 500, 600 selects a robot arm end grip type (FIG. 10, Block 1020) from the robot arm end effector storage 510D that corresponds with a predetermined processing function of the preprocess and/or the preprocess condition. In one aspect, manual tools (such as those described above) corresponding to the preprocess condition may be picked (FIG. 10, Block 1030) by the robot arm 510A, 510A' from the location of the preprocess condition. In another aspect, the preprocess may be performed (FIG. 10, Block 1025) by the auto-navigating robotic processing vehicle 500, 600 at the preprocess location (and/or during vehicle travel from the preprocess location). With the manual tools carried by the auto-navigating robotic processing vehicle 500, 600 and/or the preprocess performed (or being performed), the auto-navigating robotic processing vehicle 500, 600 moves to the processing station 110, 120 location (FIG. 10, Block 1035).

At the processing station location, in one aspect, the auto-navigating robotic processing vehicle 500, 600 hands off the manual tools and/or the preprocessed samples/trays to the human 199 (FIG. 10, Block 1035) at the processing station location. In another aspect, the auto-navigating robotic processing vehicle 500, 600 automatically identifies a robot interface (such as a door handle, an input/output of a processing device, a predetermined manual tool location at the processing station, a vehicle docking port, etc.) (FIG. 10, Block 1045) and performs an automated processing operation (FIG. 10, Block 1050). The automated processing operation may be the cleaning/sanitization (brushing or spraying) of a vent hood or housing, opening a manually operated door and placing laboratory equipment, placing a sample/tray in a processing device and starting the process corresponding to the processing device or any other suitable automated processing operation. As described above, the auto-navigating robotic processing vehicle 500, 600 (and vehicles 700, 800) are collaborative with human operations. As such, the automated processing operation may be a collaborative operation in which the auto-navigating robotic processing vehicle 500, 600 (and vehicle 700, 800) interacts/collaborates with the human 199, in the same processing station space, to perform. In one aspect, the auto-navigating robotic processing vehicle 500, 600 may hand off the results of the automated processing operation to the human 199 at the processing station location.

In one aspect, such as with the auto-navigating robotic processing vehicle 700, 800 (which do not include a robot arm), the auto-navigating robotic processing vehicle 700, 800 may move to the location of the preprocess or preprocess condition (FIG. 10, Block 1015) where a human 199 places the manual tools onto the auto-navigating robotic processing vehicle 700, 800 and/or performs a preprocess on samples/trays carried by the auto-navigating robotic processing vehicle 700, 800. The auto-navigating robotic processing vehicle 700, 800 may move to the processing station location (FIG. 10, Block 1035) where the manual tools and/or preprocessed samples/trays are handed off to a human 199 (FIG. 10, Block 1040) at the processing station 110, 120. In one aspect, the graphical user interface 667 and/or the remote graphical user interface 668 are configured to provide a confirmation of work performed and a signal to the vehicle 500, 600, 700, 800 when the work task is completed.

In one aspect, the auto-navigating robotic processing vehicle 500, 600, 700, 800 may reduce labor costs within a laboratory by assigning human operations/applications, through the scheduling activities of the controller 930, to the auto-navigating robotic processing vehicle 500, 600, 700, 800. In addition, the coordinated schedules of the auto-navigating robotic processing vehicle 500, 600, 700, 800 and the humans 199 within the laboratory facility may make sample processing more efficient compared to scheduling operations with only humans, which may also reduce labor costs.

In accordance with one or more aspects of the disclosed embodiment an auto-navigating robotic processing vehicle comproses:

a carriage having a carriage frame, an autonomous drive section connected to the carriage frame and configured to traverse the carriage effecting vehicle travel on and across a facility floor, on which is disposed at least one processing station for processing one or more of laboratory samples and sample holders, and having an autonomous navigation section communicably connected to the drive section so as to effect autonomous navigation vehicle travel with the autonomous drive section on the facility floor;

a (at least one) robot arm mounted to the carriage frame and having a robot arm end with at least one independent degree of freedom with respect to the carriage frame, the robot arm having an automatically selectable configuration with a number of different selectable robot arm process end effectors for the robot arm end, each of the number of different selectable robot arm process end effectors having a different predetermined function characteristic defining a different predetermined processing function, corresponding to the different selectable robot arm process end effector, effected with the at least one degree of freedom by the robot arm end;

a controller communicably connected to the robot arm, so as to automatically select the automatically selectable configuration of the robot arm, automatically selecting one of the different selectable robot arm process end effectors from the number of different selectable robot arm process end effectors so as to change the robot arm predetermined processing function, effected with the at least one degree of freedom by the robot arm end, from a first robot arm predetermined processing function, defined by a corresponding one of the predetermined function characteristic of a first of the different selectable robot arm process end effectors, to a second robot arm predetermined processing function, defined by a corresponding one of the predetermined function characteristic of a second of the different selectable robot arm process end effectors;

wherein the controller is configured so as to effect the autonomous navigation vehicle travel to the at least one processing station, from an initial location on the facility floor different from a location of the at least one processing station on the facility floor, and engage and effect with the first robot arm predetermined processing function a processing station operation having a station process function characteristic, and with the second robot arm predetermined processing function effect a different processing station operation having a different process function characteristic of disparate type from the station process function characteristic of the processing station operation effected with the first robot arm predetermined processing function.

In accordance with one or more aspects of the disclosed embodiment the auto-navigating robotic processing vehicle is configured to travel in a processing zone on the facility floor with the at least one processing station located in the processing zone, and a human access zone is disposed in at least part of the processing zone providing human access to a common portion of the at least one processing station engaged by the robot arm.

In accordance with one or more aspects of the disclosed embodiment the auto-navigating robotic processing vehicle, via robot arm function, and the human effect a collaborative function to the common portion of the at least one processing station.

In accordance with one or more aspects of the disclosed embodiment the auto-navigating robotic processing vehicle, via robot arm function, and the human effect a common function to the common portion of the at least one processing station.

In accordance with one or more aspects of the disclosed embodiment the auto-navigating robotic processing vehicle is configured to travel to the at least one processing station through a human access zone on the facility floor, with a human present in the human access zone.

In accordance with one or more aspects of the disclosed embodiment the auto-navigating robotic processing vehicle is configured to travel to the at least one processing station through a human access zone on the facility floor, wherein the human access zone is secured so as to block human access to the human access zone.

In accordance with one or more aspects of the disclosed embodiment the number of different selectable robot arm process end effectors are configured so as to be interchangeably coupled to the robot arm end.

In accordance with one or more aspects of the disclosed embodiment the predetermined function characteristic, of at least one of the number of different selectable robot arm process end effectors, is the at least one of the number of different selectable robot arm process end effector configured as being at least one of an anthropomorphic grip type configuration, a sample tray, rack and plate grip type configuration, and a tube grip type configuration.

In accordance with one or more aspects of the disclosed embodiment a correspond predetermined function characteristic of at least one of the number of different selectable robot arm process end effectors is an anthropomorphic grip configuration, a corresponding predetermined function characteristic of another at least one of the number of different selectable robot arm process end effectors is a sample tray, rack and plate grip configuration, and a corresponding predetermined function characteristic of a further at least one of the number of different selectable robot arm process end effectors is a tube grip configuration.

In accordance with one or more aspects of the disclosed embodiment each of the number of different selectable robot arm process end effectors is held on a storage shelf of the carriage frame, and coupled and decoupled automatically to the robot arm end on selection with the controller effecting a change to the robot arm predetermined processing function.

In accordance with one or more aspects of the disclosed embodiment the auto-navigating robotic processing vehicle further comprises a graphical user interface communicably coupled to the controller.

In accordance with one or more aspects of the disclosed embodiment an auto-navigating robotic processing vehicle comprises:

a carriage having a carriage frame, an autonomous drive section connected to the carriage frame and configured to traverse the carriage effecting vehicle travel on and across a facility floor, on which is disposed at least one processing station for processing one or more of laboratory samples and sample holders, and having an autonomous navigation section communicably connected to the autonomous drive section so as to effect autonomous navigation vehicle travel with the autonomous drive section on the facility floor;

a robot arm mounted to the carriage frame and having a robot arm end with at least one independent degree of freedom with respect to the carriage frame, the robot arm having an automatically selectable configuration with a number of different selectable robot arm process end effectors for the robot arm end, each of the number of different selectable robot arm process end effectors having a different predetermined function characteristic defining a different predetermined processing function, corresponding to the different selectable robot arm process end effector, effected with the at least one degree of freedom by the robot arm end;

a controller communicably connected to the robot arm, so as to automatically select the automatically selectable configuration of the robot arm, automatically selecting one of the different selectable robot arm process end effectors from the number of different selectable robot arm process end effectors so as to automatically change a robot arm predetermined processing function, effected with the at least one degree of freedom by the robot arm end, from an initial predetermined processing function to a corresponding predetermined processing function, defined by the predetermined function characteristic of the selected robot arm process end effector, that is different from the initial predetermined processing function;

wherein the controller is configured to receive a command identifying a travel location for the auto-navigating robotic processing vehicle, the travel location corresponding to the at least one processing station, and effect the automatic change of the robot arm predetermined processing function, effecting an automatic change in the automatically selectable configuration of the robot arm, from the initial predetermined processing function to the corresponding predetermined processing function from the different predetermined corresponding processing functions based on a station process function characteristic of the at least one processing station from a number of different station processing function characteristics of the at least one processing station.

In accordance with one or more aspects of the disclosed embodiment the auto-navigating robotic processing vehicle is configured to travel in a processing zone on the facility floor with the at least one processing station located in the processing zone, and a human access zone is disposed in at least part of the processing zone providing human access to a common portion of the at least one processing station engaged by the robot arm.

In accordance with one or more aspects of the disclosed embodiment the auto-navigating processing vehicle, via robot arm function, and the human effect a collaborative function to the common portion of the at least one processing station.

In accordance with one or more aspects of the disclosed embodiment the auto-navigating robotic processing vehicle, via robot arm function, and the human effect a common function to the common portion of the at least one processing station.

In accordance with one or more aspects of the disclosed embodiment the auto-navigating robotic processing vehicle is configured to travel to the at least one processing station through a human access zone on the facility floor, with a human present in the human access zone.

In accordance with one or more aspects of the disclosed embodiment the auto-navigating robotic processing vehicle is configured to travel to the at least one processing station through a human access zone on the facility floor, wherein the human access zone is secured so as to block human access to the human access zone.

In accordance with one or more aspects of the disclosed embodiment the number of different selectable robot arm process end effectors are configured so as to be interchangeably coupled to the robot arm end.

In accordance with one or more aspects of the disclosed embodiment the predetermined function characteristic, of at least one of the number of different selectable robot arm process end effectors, is the at least one of the number of different selectable robot arm process end effector configured as being at least one of an anthropomorphic grip type configuration, a sample tray, rack and plate grip type configuration, and a tube grip type configuration.

In accordance with one or more aspects of the disclosed embodiment a correspond predetermined function characteristic of at least one of the number of different selectable robot arm process end effectors is an anthropomorphic grip configuration, a corresponding predetermined function characteristic of another at least one of the number of different selectable robot arm process end effectors is a sample tray, rack and plate grip configuration, and a corresponding predetermined function characteristic of a further at least one of the number of different selectable robot arm process end effectors is a tube grip configuration.

In accordance with one or more aspects of the disclosed embodiment each of the number of different selectable robot arm process end effectors is held on a storage shelf of the carriage frame, and coupled and decoupled automatically to the robot arm end on selection with the controller effecting a change to the robot arm predetermined processing function.

In accordance with one or more aspects of the disclosed embodiment the auto-navigating robotic processing vehicle further comprises a graphical user interface communicably coupled to the controller.

In accordance with one or more aspects of the disclosed embodiment an auto-navigating robotic processing vehicle comprises:

a carriage having a carriage frame, an autonomous drive section connected to the carriage frame and configured to traverse the carriage effecting vehicle travel on and across a facility floor, on which is disposed at least one processing station for processing laboratory samples and/or sample holders, and having an autonomous navigation section communicably connected to the autonomous drive section so as to effect autonomous navigation vehicle travel with the autonomous drive section on the facility floor;

a processing section with a number of different processing modules connected to and carried by the carriage frame, each of the different processing modules having a different predetermined laboratory processing function with a different predetermined function characteristic corresponding to the processing module, each different processing module and corresponding predetermined function being automatically selectable to effect automatically with the corresponding predetermined function, independent of or in combination with vehicle travel, a preprocess or preprocess condition of one or more of the laboratory samples and sample holders with respect to a process at the at least one processing station;

a controller communicably connected to each different processing module, so as to automatically select at least one processing module, from the different processing modules, and the corresponding predetermined function of the selected at least one processing module effecting automatically the preprocess or preprocess condition based on an identification of a travel location for the auto-navigating robotic processing vehicle and the process of the at the at least one processing station.

In accordance with one or more aspects of the disclosed embodiment at least one processing module is a robot arm, mounted to the carriage, having a robot arm end with at least one independent degree of freedom with respect to the carriage frame and an automatically selectable configuration, automatically selecting one end effector from different selectable end effectors so as to change a robot arm predetermined processing function, effected with the at least one independent degree of freedom of the robot arm end, from a first robot arm predetermined processing function, defined by a corresponding function characteristic of a first of the selectable end effectors, to a second robot arm predetermined processing function, defined by a corresponding function characteristic of a second of the selectable end effectors.

In accordance with one or more aspects of the disclosed embodiment the controller is configured so as to effect the autonomous navigation vehicle travel to the identified travel location, from an initial location on the facility floor different from the identified location, and engage and effect with the first robot arm predetermined processing function an operation defining the preprocess or preprocess condition, and with the second robot arm predetermined processing function effect a processing station operation related to the preprocess or preprocess condition.

In accordance with one or more aspects of the disclosed embodiment the different selectable end effectors includes an anthropomorphic grip end effector and the robot arm is configured to, with the anthropomorphic grip effector, effect a preprocess condition based on the process of the at least one processing station, wherein the robot arm picks up, with the anthropomorphic grip effector, a manual tool related to the process of the at least one processing station at the travel location.

In accordance with one or more aspects of the disclosed embodiment the auto-navigating robotic processing vehicle is configured to transport the manual tool to the at least one processing station so as to automatically effect process station operation, wherein the robot arm one or more of places the manual tool at the at least one processing station and engages the manual tool to the at least one processing station.

In accordance with one or more aspects of the disclosed embodiment the number of different selectable robot arm process end effectors are configured so as to be interchangeably coupled to the robot arm end.

In accordance with one or more aspects of the disclosed embodiment the corresponding function characteristic, of at least one of the first and the second of the selectable end effectors, is the at least one of the first and the second of the selectable end effector configured as being at least one of an anthropomorphic grip type configuration, a sample tray, rack and plate grip type configuration, and a tube grip type configuration.

In accordance with one or more aspects of the disclosed embodiment the correspond function characteristic of at least one of the first and the second of the selectable end effector is an anthropomorphic grip configuration, a corresponding predetermined function characteristic of another at least one of the number of different selectable robot arm process end effectors is a sample tray, rack and plate grip configuration, and a corresponding predetermined function characteristic of a further at least one of the number of different selectable robot arm process end effectors is a tube grip configuration.

In accordance with one or more aspects of the disclosed embodiment each of the different selectable end effectors is held on a storage shelf of the carriage frame, and coupled and decoupled automatically to the robot arm end on selection with the controller effecting the change to the robot arm predetermined processing function.

In accordance with one or more aspects of the disclosed embodiment the auto-navigating robotic processing vehicle is configured to travel in a processing zone on the facility floor with the at least one processing station located in the processing zone, and a human access zone is disposed in at least part of the processing zone providing human access to a common portion of the at least one processing station engaged by the robot arm.

In accordance with one or more aspects of the disclosed embodiment the auto-navigating robotic processing vehicle, via robot arm function, and the human effect a collaborative function to the common portion of the at least one processing station.

In accordance with one or more aspects of the disclosed embodiment the auto-navigating robotic processing vehicle, via robot arm function, and the human effect a common function to the common portion of the at least one processing station.

In accordance with one or more aspects of the disclosed embodiment the auto-navigating robotic processing vehicle is configured to travel to the at least one processing station through a human access zone on the facility floor, with a human present in the human access zone.

In accordance with one or more aspects of the disclosed embodiment the auto-navigating robotic processing vehicle is configured to travel to the at least one processing station through a human access zone on the facility floor, wherein the human access zone is secured so as to block human access to the human access zone.

In accordance with one or more aspects of the disclosed embodiment the auto-navigating robotic processing vehicle further comprises a graphical user interface communicably coupled to the controller.

In accordance with one or more aspects of the disclosed embodiment a method is provided. The method includes:

providing a carriage of an auto-navigating robotic processing vehicle, the carriage having a carriage frame, an autonomous drive section connected to the carriage frame and configured to traverse the carriage effecting vehicle travel on and across a facility floor, on which is disposed at least one processing station for processing laboratory samples and/or sample holders, and having an autonomous navigation section communicably connected to the autonomous drive section effecting autonomous navigation vehicle travel with the autonomous drive section on the facility floor;

providing a processing section with a number of different processing modules connected to and carried by the carriage frame, each of the different processing modules having a different predetermined laboratory processing function with a different predetermined function characteristic corresponding to the processing module, each different processing module and corresponding predetermined function being automatically selectable to effect automatically with the corresponding predetermined function, independent of or in combination with vehicle travel, a preprocess or preprocess condition of one or more of the laboratory samples and sample holders with respect to a process at the at least one processing station;

automatically selecting, with a controller communicably connected to each different processing module, at least one processing module, from the different processing modules, and the corresponding predetermined function of the selected at least one processing module effecting automatically the preprocess or preprocess condition based on an identification of a travel location for the auto-navigating robotic processing vehicle and the process of the at the at least one processing station.

In accordance with one or more aspects of the disclosed embodiment at least one processing module is a robot arm, mounted to the carriage, having a robot arm end with at least one independent degree of freedom with respect to the carriage frame and an automatically selectable configuration, the method further comprising automatically selecting one end effector from different selectable robot arm process end effectors so as to change a robot arm predetermined processing function, effected with the at least one independent degree of freedom of the robot arm end, from a first robot arm predetermined processing function, defined by a corresponding function characteristic of a first of the different selectable robot arm process end effectors, to a second robot arm predetermined processing function, defined by a corresponding function characteristic of a second of the different selectable robot arm process end effectors.

In accordance with one or more aspects of the disclosed embodiment the method further includes effecting, with the controller, the autonomous navigation vehicle travel to the identified travel location, from an initial location on the facility floor different from the identified location, and engaging and effecting with the first robot arm predetermined processing function an operation defining the preprocess or preprocess condition, and with the second robot arm predetermined processing function effecting a processing station operation related to the preprocess or preprocess condition.

In accordance with one or more aspects of the disclosed embodiment the different selectable robot arm process end effectors includes an anthropomorphic grip end effector, the method further comprising effecting, with the robot arm including the anthropomorphic grip effector, a preprocess condition based on the process of the at least one processing station, wherein the robot arm picks up, with the anthropomorphic grip effector, a manual tool related to the process of the at least one processing station at the travel location.

In accordance with one or more aspects of the disclosed embodiment the method further includes transporting, with the auto-navigating robotic processing vehicle, the manual tool to the at least one processing station so as to automatically effect process station operation, wherein the robot arm one or more of places the manual tool at the at least one processing station and engages the manual tool to the at least one processing station.

In accordance with one or more aspects of the disclosed embodiment wherein the number of different selectable robot arm process end effectors are configured so as to be interchangeably coupled to the robot arm end.

In accordance with one or more aspects of the disclosed embodiment wherein the corresponding function characteristic, of at least one of the first and the second of the different selectable robot arm process end effectors, is the at least one of the first and the second of the different selectable robot arm process end effectors configured as being at least one of an anthropomorphic grip type configuration, a sample tray, rack and plate grip type configuration, and a tube grip type configuration.

In accordance with one or more aspects of the disclosed embodiment wherein the corresponding function characteristic of at least one of the first and the second of the different selectable robot arm process end effectors is an anthropomorphic grip configuration, a corresponding predetermined function characteristic of another at least one of the number of different selectable robot arm process end effectors is a sample tray, rack and plate grip configuration, and a corresponding predetermined function characteristic of a further at least one of the number of different selectable robot arm process end effectors is a tube grip configuration.

In accordance with one or more aspects of the disclosed embodiment wherein effecting the change to the robot arm predetermined processing function includes coupling and decoupling, each of the different selectable robot arm process end effectors held on a storage shelf of the carriage frame, automatically to the robot arm end on selection with the controller.

In accordance with one or more aspects of the disclosed embodiment the method further includes traversing a processing zone on the facility floor, with the auto-navigating robotic processing vehicle, with the at least one processing station located in the processing zone, and a human access zone is disposed in at least part of the processing zone providing human access to a common portion of the at least one processing station engaged by the robot arm.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. An auto-navigating robotic processing vehicle comprising:
    a carriage having a carriage frame, an autonomous drive section connected to the carriage frame and configured to traverse the carriage effecting vehicle travel, displacing the vehicle as a unit, on and across a facility floor, on which is disposed at least one processing station for processing laboratory samples and/or sample holders, and having an autonomous navigation section communicably connected to the autonomous drive section so as to effect autonomous navigation vehicle travel with the autonomous drive section on the facility floor;
    a processing section with a number of different processing modules connected to and carried by the carriage frame, each of the different processing modules having a different predetermined laboratory processing function with a different predetermined function characteristic corresponding to the processing module, each different processing module and corresponding predetermined function being automatically selectable to effect automatically with the corresponding predetermined function, both independent of and in combination with vehicle travel, displacing the vehicle as a unit, a preprocess or preprocess condition of one or more of the laboratory samples and sample holders with respect to a process at the at least one processing station;
    a controller communicably connected to each different processing module, so as to automatically select at least one processing module, from the different processing modules, and the corresponding predetermined function of the selected at least one processing module effecting automatically the preprocess or preprocess condition based on an identification of a travel location for the auto-navigating robotic processing vehicle and the process of the at the at least one processing station.

2. The auto-navigating robotic processing vehicle of claim 1, wherein at least one processing module is a robot arm, mounted to the carriage, having a robot arm end with at least one independent degree of freedom with respect to the carriage frame and an automatically selectable configuration, automatically selecting one end effector from different selectable robot arm process end effectors so as to change a robot arm predetermined processing function, effected with the at least one independent degree of freedom of the robot arm end, from a first robot arm predetermined processing function, defined by a corresponding function characteristic of a first of the different selectable robot arm process end effectors, to a second robot arm predetermined processing function, defined by a corresponding function characteristic of a second of the different selectable robot arm process end effectors.

3. The auto-navigating robotic processing vehicle of claim 2, wherein the controller is configured so as to effect the autonomous navigation vehicle travel to the identified travel location, from an initial location on the facility floor different from the identified location, and engage and effect with the first robot arm predetermined processing function an operation defining the preprocess or preprocess condition, and with the second robot arm predetermined processing function effect a processing station operation related to the preprocess or preprocess condition.

4. The auto-navigating robotic processing vehicle of claim 2, wherein the different selectable robot arm process end effectors includes an anthropomorphic grip end effector and the robot arm is configured to, with the anthropomorphic grip effector, effect a preprocess condition based on the process of the at least one processing station, wherein the robot arm picks up, with the anthropomorphic grip effector, a manual tool related to the process of the at least one processing station at the travel location.

5. The auto-navigating robotic processing vehicle of claim 4, wherein the auto-navigating robotic processing vehicle is configured to transport the manual tool to the at least one processing station so as to automatically effect process station operation, wherein the robot arm one or more of places the manual tool at the at least one processing station and engages the manual tool to the at least one processing station.

6. The auto-navigating robotic processing vehicle of claim 2, wherein the number of different selectable robot arm process end effectors are configured so as to be interchangeably coupled to the robot arm end.

7. The auto-navigating robotic processing vehicle of claim 2, wherein the corresponding function characteristic, of at least one of the first and the second of the different selectable robot arm process end effectors, is the at least one of the first and the second of the different selectable robot arm process end effectors configured as being at least one of an anthropomorphic grip type configuration, a sample tray, rack and plate grip type configuration, and a tube grip type configuration.

8. The auto-navigating robotic processing vehicle of claim 2, wherein:
    the corresponding function characteristic of at least one of the first and the second of the different selectable robot arm process end effectors is an anthropomorphic grip configuration, and
    the number of different selectable robot arm process end effectors includes another at least one robot arm process end effector with a corresponding predetermined function characteristic that is a sample tray, rack and plate grip configuration, and
    the number of different selectable robot arm process end effectors includes a further robot arm end effector with a corresponding predetermined function characteristic that is a tube grip configuration.

9. The auto-navigating robotic processing vehicle of claim 2, wherein each of the different selectable robot arm process end effectors is held on a storage shelf of the carriage frame, and coupled and decoupled automatically to the robot arm end on selection with the controller effecting the change to the robot arm predetermined processing function.

10. The auto-navigating robotic processing vehicle of claim 1, wherein the auto-navigating robotic processing vehicle is configured to travel in a processing zone on the facility floor with the at least one processing station located in the processing zone, and a human access zone is disposed in at least part of the processing zone providing human access to a common portion of the at least one processing station engaged by the robot arm.

11. The auto-navigating robotic processing vehicle of claim 6, wherein the auto-navigating robotic processing vehicle, via robot arm function, and the human effect a collaborative function to the common portion of the at least one processing station.

12. The auto-navigating robotic processing vehicle of claim 6, wherein the auto-navigating robotic processing vehicle, via robot arm function, and the human effect a common function to the common portion of the at least one processing station.

13. The auto-navigating robotic processing vehicle of claim 1, wherein the auto-navigating robotic processing vehicle is configured to travel to the at least one processing station through a human access zone on the facility floor, with a human present in the human access zone.

14. The auto-navigating robotic processing vehicle of claim 1, wherein the auto-navigating robotic processing vehicle is configured to travel to the at least one processing station through a human access zone on the facility floor, wherein the human access zone is secured so as to block human access to the human access zone.

15. The auto-navigating robotic processing vehicle of claim 1, further comprising a graphical user interface communicably coupled to the controller.

16. An auto-navigating robotic processing vehicle comprising:
a carriage having a carriage frame, an autonomous drive section connected to the carriage frame and configured to traverse the carriage effecting vehicle travel, displacing the vehicle as a unit, on and across a facility floor, on which is disposed at least one processing station for processing one or more of laboratory samples and sample holders, and having an autonomous navigation section communicably connected to the drive section so as to effect autonomous navigation vehicle travel with the autonomous drive section on the facility floor;
a robot arm mounted to the carriage frame and having a robot arm end with at least one independent degree of freedom with respect to the carriage frame, the robot arm having an automatically selectable configuration with a number of different selectable robot arm process end effectors for the robot arm end, each of the number of different selectable robot arm process end effectors having a different predetermined function characteristic defining a different predetermined processing function, corresponding to the different selectable robot arm process end effector, effected with the at least one degree of freedom by the robot arm end;
a controller communicably connected to the robot arm, so as to automatically select the automatically selectable configuration of the robot arm, automatically selecting one of the different selectable robot arm process end effectors from the number of different selectable robot arm process end effectors so as to change the robot arm predetermined processing function, effected with the at least one degree of freedom by the robot arm end, from a first robot arm predetermined processing function, defined by a corresponding one of the predetermined function characteristic of a first of the different selectable robot arm process end effectors, to a second robot arm predetermined processing function, defined by a corresponding one of the predetermined function characteristic of a second of the different selectable robot arm process end effectors;
wherein the controller is configured so as to effect the autonomous navigation vehicle travel to the at least one processing station, from an initial location on the facility floor different from a location of the at least one processing station on the facility floor, and engage and effect with the first robot arm predetermined processing function a processing station operation having a station process function characteristic, and with the second robot arm predetermined processing function effect a different processing station operation having a different process function characteristic of disparate type from the station process function characteristic of the processing station operation effected with the first robot arm predetermined processing function.

17. The auto-navigating robotic processing vehicle of claim 16, wherein the auto-navigating robotic processing vehicle is configured to travel in a processing zone on the facility floor with the at least one processing station located in the processing zone, and a human access zone is disposed in at least part of the processing zone providing human access to a common portion of the at least one processing station engaged by the robot arm.

18. The auto-navigating robotic processing vehicle of claim 17, wherein the auto-navigating robotic processing vehicle, via robot arm function, and the human effect a collaborative function to the common portion of the at least one processing station.

19. The auto-navigating robotic processing vehicle of claim 17, wherein the auto-navigating robotic processing vehicle, via robot arm function, and the human effect a common function to the common portion of the at least one processing station.

20. The auto-navigating robotic processing vehicle of claim 16, wherein the auto-navigating robotic processing vehicle is configured to travel to the at least one processing station through a human access zone on the facility floor, with a human present in the human access zone.

21. The auto-navigating robotic processing vehicle of claim 16, wherein the auto-navigating robotic processing vehicle is configured to travel to the at least one processing station through a human access zone on the facility floor, wherein the human access zone is secured so as to block human access to the human access zone.

22. The auto-navigating robotic processing vehicle of claim 16, wherein the number of different selectable robot arm process end effectors are configured so as to be interchangeably coupled to the robot arm end.

23. The auto-navigating robotic processing vehicle of claim 16, wherein the predetermined function characteristic, of at least one of the number of different selectable robot arm process end effectors, is the at least one of the number of different selectable robot arm process end effector configured as being at least one of an anthropomorphic grip type configuration, a sample tray, rack and plate grip type configuration, and a tube grip type configuration.

24. The auto-navigating robotic processing vehicle of claim 16, wherein:
a correspond predetermined function characteristic of at least one of the number of different selectable robot arm process end effectors is an anthropomorphic grip configuration, and
the number of different selectable robot arm process end effectors includes another at least one robot arm process end effector with a corresponding predetermined function characteristic that is a sample tray, rack and plate grip configuration, and
the different selectable robot arm process end effectors includes a further robot arm process end effector with a corresponding predetermined function characteristic that is a tube grip configuration.

25. The auto-navigating robotic processing vehicle of claim 16, wherein each of the number of different selectable robot arm process end effectors is held on a storage shelf of the carriage frame, and coupled and decoupled automatically to the robot arm end on selection with the controller effecting a change to the robot arm predetermined processing function.

26. The auto-navigating robotic processing vehicle of claim 16, further comprising a graphical user interface communicably coupled to the controller.

27. An auto-navigating robotic processing vehicle comprising:
a carriage having a carriage frame, an autonomous drive section connected to the carriage frame and configured to traverse the carriage effecting vehicle travel, displacing the vehicle as a unit, on and across a facility floor, on which is disposed at least one processing station for processing one or more of laboratory samples and sample holders, and having an autonomous navigation section communicably connected to the autonomous drive section so as to effect autonomous navigation vehicle travel with the autonomous drive section on the facility floor;
a robot arm mounted to the carriage frame and having a robot arm end with at least one independent degree of freedom with respect to the carriage frame, the robot arm having an automatically selectable configuration with a number of different selectable robot arm process end effectors for the robot arm end, each of the number of different selectable robot arm process end effectors having a different predetermined function characteristic defining a different predetermined processing function, corresponding to the different selectable robot arm process end effector, effected with the at least one degree of freedom by the robot arm end;
a controller communicably connected to the robot arm, so as to automatically select the automatically selectable configuration of the robot arm, automatically selecting one of the different selectable robot arm process end effectors from the number of different selectable robot arm process end effectors so as to automatically change a robot arm predetermined processing function, effected with the at least one degree of freedom by the robot arm end, from an initial predetermined processing function to a corresponding predetermined processing function, defined by the predetermined function characteristic of the selected robot arm process end effector, that is different from the initial predetermined processing function;

wherein the controller is configured to
receive a command identifying a travel location for the auto-navigating robotic processing vehicle, the travel location corresponding to the at least one processing station, and
effect the automatic change of the robot arm predetermined processing function, effecting an automatic change in the automatically selectable configuration of the robot arm, from the initial predetermined processing function to the corresponding predetermined processing function from the different predetermined corresponding processing functions based on a station process function characteristic of a destination processing station of the at least one processing station from a number of different station processing function characteristics of the at least one processing station.

28. The auto-navigating robotic processing vehicle of claim 27, wherein the auto-navigating robotic processing vehicle is configured to travel in a processing zone on the facility floor with the at least one processing station located in the processing zone, and a human access zone is disposed in at least part of the processing zone providing human access to a common portion of the at least one processing station engaged by the robot arm.

29. The auto-navigating robotic processing vehicle of claim 28, wherein the auto-navigating processing vehicle, via robot arm function, and the human effect a collaborative function to the common portion of the at least one processing station.

30. The auto-navigating robotic processing vehicle of claim 28, wherein the auto-navigating robotic processing vehicle, via robot arm function, and the human effect a common function to the common portion of the at least one processing station.

31. The auto-navigating robotic processing vehicle of claim 27, wherein the auto-navigating robotic processing vehicle is configured to travel to the at least one processing station through a human access zone on the facility floor, with a human present in the human access zone.

32. The auto-navigating robotic processing vehicle of claim 27, wherein the auto-navigating robotic processing vehicle is configured to travel to the at least one processing station through a human access zone on the facility floor, wherein the human access zone is secured so as to block human access to the human access zone.

33. The auto-navigating robotic processing vehicle of claim 27, wherein the number of different selectable robot arm process end effectors are configured so as to be interchangeably coupled to the robot arm end.

34. The auto-navigating robotic processing vehicle of claim 27, wherein the predetermined function characteristic, of at least one of the number of different selectable robot arm process end effectors, is the at least one of the number of different selectable robot arm process end effector configured as being at least one of an anthropomorphic grip type configuration, a sample tray, rack and plate grip type configuration, and a tube grip type configuration.

35. The auto-navigating robotic processing vehicle of claim 27, wherein:
a correspond predetermined function characteristic of at least one of the number of different selectable robot arm process end effectors is an anthropomorphic grip configuration, and
the number of different selectable robot arm process end effectors includes another at least one robot arm process end effector with a corresponding predetermined function characteristic that is a sample tray, rack and plate grip configuration, and the different selectable robot arm process end effectors includes a further robot arm process end effector with a corresponding predetermined function characteristic that is a tube grip configuration.

36. The auto-navigating robotic processing vehicle of claim 27, wherein each of the number of different selectable robot arm process end effectors is held on a storage shelf of the carriage frame, and coupled and decoupled automatically to the robot arm end on selection with the controller effecting a change to the robot arm predetermined processing function.

37. The auto-navigating robotic processing vehicle of claim 27, further comprising a graphical user interface communicably coupled to the controller.

38. A method comprising:
providing a carriage of an auto-navigating robotic processing vehicle, the carriage having a carriage frame, an autonomous drive section connected to the carriage frame and configured to traverse the carriage effecting vehicle travel, displacing the vehicle as a unit, on and across a facility floor, on which is disposed at least one processing station for processing laboratory samples and/or sample holders, and having an autonomous navigation section communicably connected to the autonomous drive section effecting autonomous navigation vehicle travel with the autonomous drive section on the facility floor;
providing a processing section with a number of different processing modules connected to and carried by the carriage frame, each of the different processing modules having a different predetermined laboratory processing function with a different predetermined function characteristic corresponding to the processing module, each different processing module and corresponding predetermined function being automatically selectable to effect automatically with the corresponding predetermined function, both independent of r and in combination with vehicle travel, displacing the vehicle as a unit, a preprocess or preprocess condition of one or more of the laboratory samples and sample holders with respect to a process at the at least one processing station;
automatically selecting, with a controller communicably connected to each different processing module, at least one processing module, from the different processing modules, and the corresponding predetermined function of the selected at least one processing module effecting automatically the preprocess or preprocess condition based on an identification of a travel location for the auto-navigating robotic processing vehicle and the process of the at the at least one processing station.

39. The method of claim 38, wherein at least one processing module is a robot arm, mounted to the carriage, having a robot arm end with at least one independent degree of freedom with respect to the carriage frame and an automatically selectable configuration, the method further comprising automatically selecting one end effector from different selectable robot arm process end effectors so as to change a robot arm predetermined processing function, effected with the at least one independent degree of freedom of the robot arm end, from a first robot arm predetermined processing function, defined by a corresponding function characteristic of a first of the different selectable robot arm process end effectors, to a second robot arm predetermined processing function, defined by a corresponding function characteristic of a second of the different selectable robot arm process end effectors.

40. The method of claim 39, further comprising effecting, with the controller, the autonomous navigation vehicle travel to the identified travel location, from an initial location on the facility floor different from the identified location, and engaging and effecting with the first robot arm predetermined processing function an operation defining the preprocess or preprocess condition, and with the second robot arm predetermined processing function effecting a processing station operation related to the preprocess or preprocess condition.

41. The method of claim 39, wherein the different selectable robot arm process end effectors includes an anthropomorphic grip end effector, the method further comprising effecting, with the robot arm including the anthropomorphic grip effector, a preprocess condition based on the process of the at least one processing station, wherein the robot arm picks up, with the anthropomorphic grip effector, a manual tool related to the process of the at least one processing station at the travel location.

42. The method of claim 41, further comprising transporting, with the auto-navigating robotic processing vehicle, the manual tool to the at least one processing station so as to automatically effect process station operation, wherein the robot arm one or more of places the manual tool at the at least one processing station and engages the manual tool to the at least one processing station.

43. The method of claim 39, wherein the number of different selectable robot arm process end effectors are configured so as to be interchangeably coupled to the robot arm end.

44. The method of claim 39, wherein the corresponding function characteristic, of at least one of the first and the second of the different selectable robot arm process end effectors, is the at least one of the first and the second of the different selectable robot arm process end effectors configured as being at least one of an anthropomorphic grip type configuration, a sample tray, rack and plate grip type configuration, and a tube grip type configuration.

45. The method of claim 39, wherein:
the corresponding function characteristic of at least one of the first and the second of the different selectable robot arm process end effectors is an anthropomorphic grip configuration, and
the number of different selectable robot arm process end effectors includes another at least one robot arm process end effector with a corresponding predetermined function characteristic that is a sample tray, rack and plate grip configuration, and
the different selectable robot arm process end effectors includes a further robot arm process end effector with a corresponding predetermined function characteristic that is a tube grip configuration.

46. The method of claim 39, wherein effecting the change to the robot arm predetermined processing function includes coupling and decoupling, each of the different selectable robot arm process end effectors held on a storage shelf of the carriage frame, automatically to the robot arm end on selection with the controller.

47. The method of claim 38, further comprising traversing a processing zone on the facility floor, with the auto-navigating robotic processing vehicle, with the at least one processing station located in the processing zone, and a human access zone is disposed in at least part of the processing zone providing human access to a common portion of the at least one processing station engaged by the robot arm.

* * * * *